US011483282B1

(12) United States Patent
Rubin-Smith et al.

(10) Patent No.: US 11,483,282 B1
(45) Date of Patent: Oct. 25, 2022

(54) MONITORING INTERNET PROTOCOL ADDRESS UTILIZATION TO APPLY UNIFIED NETWORK POLICY

(71) Applicant: Amazon Technologies, Inc., Seattle, WA (US)

(72) Inventors: Eric Andrew Rubin-Smith, Fairfax, VA (US); Leonid Nikolayev, Vienna, VA (US); Shovan Kumar Das, Medina, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/547,652

(22) Filed: Dec. 10, 2021

(51) Int. Cl.
*H04L 29/12* (2006.01)
*H04L 29/06* (2006.01)
*H04L 29/08* (2006.01)
*H04L 61/5007* (2022.01)

(52) U.S. Cl.
CPC .............................. *H04L 61/5007* (2022.05)

(58) Field of Classification Search
CPC ................................................. H04L 61/5007
See application file for complete search history.

(56) References Cited

U.S. PATENT DOCUMENTS

| 10,498,693 | B1* | 12/2019 | Strauss | H04L 61/50 |
| 10,693,715 | B1* | 6/2020 | Strauss | H04L 61/255 |
| 10,715,485 | B2* | 7/2020 | Miller | H04L 63/20 |
| 10,848,423 | B1* | 11/2020 | Chen | H04L 45/745 |
| 11,102,164 | B1* | 8/2021 | Gupta | H04L 45/586 |

* cited by examiner

*Primary Examiner* — Christopher B Robinson
(74) *Attorney, Agent, or Firm* — Lee & Hayes, P.C.

(57) ABSTRACT

Techniques implemented by an IP address management (IPAM) system for monitoring the usage of IP addresses in networks of computing resources and automatically notifying networking devices when IP address usage has changed. The IPAM system may create pools of IP addresses (e.g., address groups), and map those pools to prefix lists that are distributed to the networking devices. The IPAM system may monitor changes in IP address usage by resources in the networks (e.g., allocations and releases of IP addresses), update the pools that are affected by the changes, carry those changes through to the appropriate prefix lists, and propagate updated prefix lists to the networking devices (e.g., firewall devices, routing devices, etc.). In this way, the IPAM system may automatically identify and apply IP address changes to prefix lists that are used for networking operations in the networks.

20 Claims, 16 Drawing Sheets

MONITORING INTERNET PROTOCOL ADDRESS UTILIZATION TO APPLY UNIFIED NETWORK POLICY

BACKGROUND

Computer networks are sets of interconnected computing devices that communicate with each other using communication protocols over digital connections. Various communication protocols exist that enable computing devices to communicate by defining rules for how to package data, encrypt data, transmit data, receive data, and so forth. To ensure that data traffic is routed and communicated through networks to the correct destination devices, the Internet Protocol (IP) provides an addressing system where computing devices are provided with unique addresses, called IP addresses. When computing devices join networks, they are provided unique IP addresses that enable them to effectively communicate traffic with other devices over the networks. Similarly, when computing devices leave the networks, they release their IP addresses which can then be re-allocated for use by future devices. To ensure that data is communicated to the correct devices, computing devices are generally provided unique, non-overlapping IP addresses to avoid problems with routing and communication of data.

Thus, every computing device, resource, and workload connected to a network depends on its IP address to communicate. The explosive growth of network-connected mobile devices and Internet-of-Things (IoT) devices, along with the rapid shift in workloads to the cloud, requires organizations and entities to plan, track, and manage IP addresses at large scales. Organizations that manage networks must keep track of information associated with potentially hundreds of thousands of IP addresses, including the inventory of used and unused IP addresses, subnetworks, routing domains, security settings, and so forth. This task can be complex and can lead to latency in allocating IP addresses to new devices, IP address conflicts, resource connectivity issues and application downtime, and other issues. Additionally, mismanagement of IP addresses can result in network issues, such as inaccurate routing tables, outdated access lists of firewalls, and so forth.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
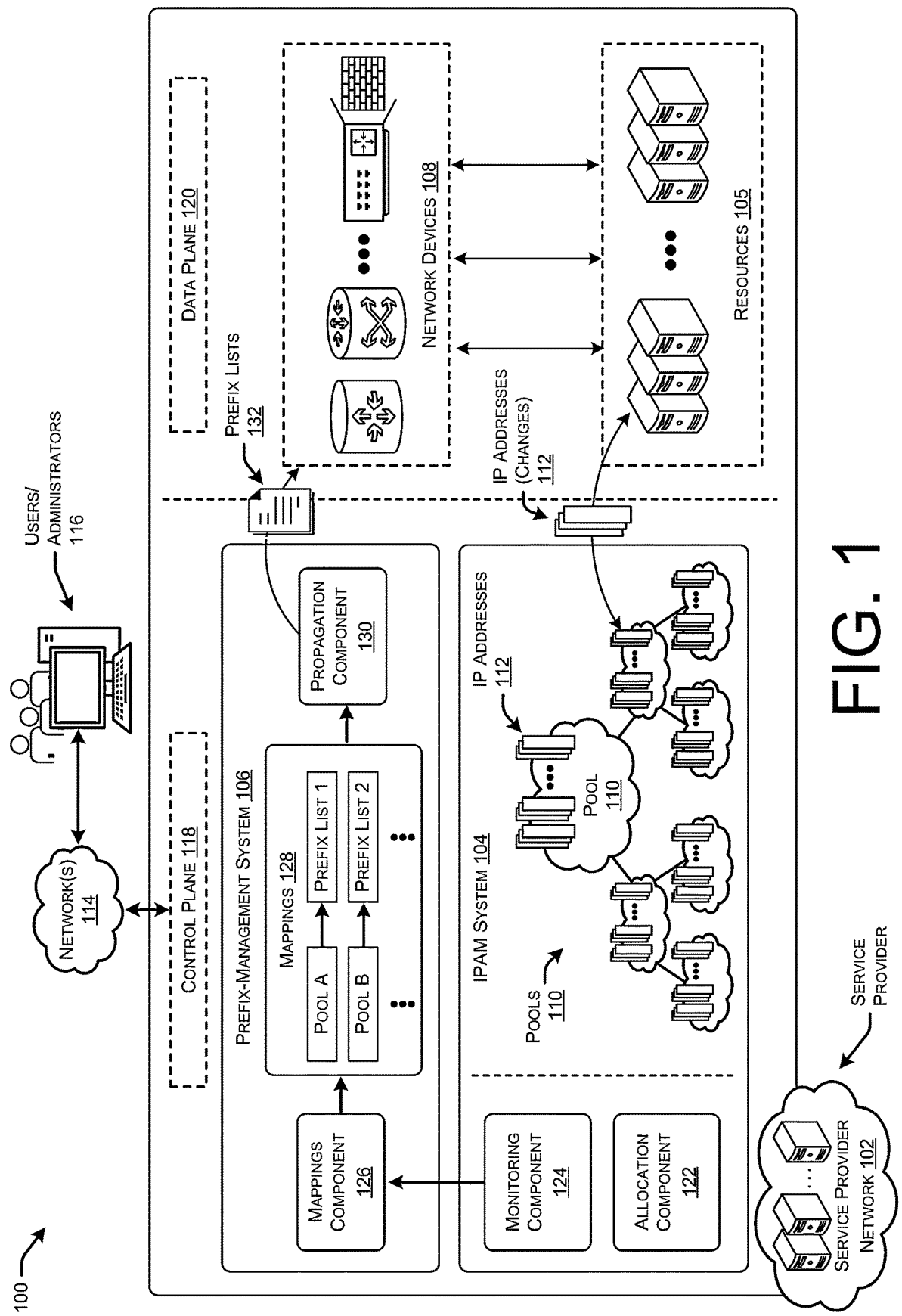
FIG. 1 illustrates a system-architecture diagram of an example environment in which an IP address management (IPAM) system monitors the usage of IP addresses across a network, maps changes to prefix lists, and a prefix-management system propagates the updated prefix lists to network devices.

IP addresses are used by networking devices to perform various networking operations. For instance, firewall devices allow and/or deny traffic communicated between devices based on lists of IP addresses, routing devices maintain route tables that use IP addresses as a means to communicate data to appropriate destination devices, and so forth. As IP address usage in a network changes, the network devices must be apprised of these changes or undesirable results can occur. As an example, firewall devices may allow traffic to reach destination devices that is not secure or permitted, routing devices may route traffic to the incorrect devices that results in packet loss, and so forth.

This disclosure describes techniques implemented by an IPAM system for monitoring the usage of IP addresses in networks of computing resources and automatically notifying networking devices when IP address usage has changed. The IPAM system may create pools of IP addresses (e.g., address groups), and map those pools to prefix lists that are distributed to the networking devices. The IPAM system may monitor changes in IP address usage by resources in the networks (e.g., allocations and releases of IP addresses), update the pools that are affected by the changes, carry those changes through to the appropriate prefix lists, and propagate updated prefix lists to the networking devices (e.g., firewall devices, routing devices, etc.). In this way, the IPAM system may automatically identify and apply IP address changes to prefix lists that are used for networking operations in the networks.

In some examples, the IPAM system may be provided by, and managed by, a service provider network (e.g., cloud provider platform) that provides computing resources to users. For instance, users may register with the service provider network to host networks of resources in the service provider network. Network administrators for the networks may register for use of the IPAM system in order to begin automating IP address workflows in their network(s).

Network administrators can enroll for use of the IPAM system and begin to define how to allocate their inventory of IP addresses for resources in their network. The network administrators may initially create various virtualized domains that can be used to allocate groupings of IP addresses. For instance, a network administrator may use the IPAM system to create IP spaces for individual networks, referred to herein as "scopes." Network administrators can define a scope for each network that defines the total IP space allocated for that network. By providing scopes, the IPAM system allows network administrators to reuse IP address spaces across networks. However, because a network cannot have overlapping IP addresses on multiple resources, the scopes allow for reuse of IP address spaces across unconnected networks.

After creating scopes, network administrators may define groupings of IP addresses that are allocated for different resource groups, different teams in an organization, and so forth. These groups of IP addresses, often referred to herein as "pools," may include collections of contiguous IP address ranges (e.g., Classless Inter Domain Routing (CIDR) blocks) that are allocated or partitioned for use by different entities. For example, the network administrator may define a pool of IP addresses that are usable by a production team in an organization, and define another pool of IP addresses that are only usable by a developer team in the organization, and so forth. By providing pools, the IPAM system allows network administrators to apply policy on a pool-by-pool basis, thereby allowing network administrators to manage organizational teams differently, resource types differently, user accounts differently, and so forth.

The network administrators are then able to define allocation policies for the pools of IP addresses which define rules for how the IP addresses are allocated to different resources, user accounts, and so forth. For instance, an allocation policy may be used to define (i) what user accounts are allowed to request and use IP addresses from certain pools, (ii) minimum and maximum amounts of IP addresses (e.g., CIDR blocks) that can be allocated from pools, (iii) what resource types are permitted to use IP addresses from pools, and so forth. In this way, the network administrators may define and attach different allocation policies across their pools in order to treat organizational entities, resource types, etc., differently regarding IP address allocation. By automating the allocation of IP addresses according to defined policy, the IPAM system reduces the latency in providing IP addresses when requested, the chances of overlapping IP addresses, and the chance of other errors occurring when allocating IP addresses from pools.

The IPAM system may then begin allocating IP addresses from pools and to resources according to the allocation policies and/or various other policies. The IPAM system may use one or more data structures (e.g., trie data structure, search tree, etc.) to track and maintain the state of unused IP addresses, IP addresses that have been allocated by the IPAM system, and/or various metadata associated with IP address usage (e.g., utilization metrics for pools, policies, alerts, threshold, remedial actions, etc.). The IPAM system may update the data structures to indicate the state of the IP address usage in the network(s), or what the IPAM system has determined the current state of IP address usage is in the networks.

In some instances, the service provider network may support a prefix-management system that allows network administrators to configure and maintain lists of prefixes (e.g., a set of one or more CIDR blocks) that are used for various networking operations. For instance, the prefix-management system may use prefix lists for applying security policy (e.g., access control lists (ACLs) of firewalls), defining routes (e.g., routing tables for routing devices), and so forth. In this way, as networks of resources scale, the prefix lists may be used to apply consistent network policy on network traffic and for network operations for large groups of resources rather than referencing resources individually.

However, as noted above, IP addresses are continuously being allocated to resources, released from use by resources, moved between pools, recycled, and so forth. Accordingly, as IP address usage changes, the prefix lists that are used by networking devices may become out-of-sync with respect to the intent and policy of network administrators. That is, traffic from devices may be allowed by firewall devices that should have been denied, traffic may be routed to the incorrect destination devices, and so forth. Thus, the prefix lists must be updated to ensure that networking operations are consistent with the state of IP address allocation and network policy or intent.

The techniques described herein include harnessing the IPAM system's ability to automatically monitor IP address usage in networks using pools, and mapping the changes made to the pools of IP addresses to prefix lists that are managed by the prefix-management system. To initiate, the process, the IPAM system may map pools to different prefix lists according to network intent or policy. As a specific example, a set of resources that have IP addresses allocated from a same pool may be managed by a testing team of an organization, and all traffic from customer devices is to be dropped and not sent to the set of testing resources. In this example, the pool may be mapped to a prefix list that is used for enforcing security policies by firewall devices. The prefix list may be updated to include the IP addresses allocated to the testing resources from the pool, and propagated to firewall devices where a deny rule can be applied to all traffic on that prefix list.

To harness the monitoring abilities of the IPAM system on behalf of the prefix-management system, the pools may initially be mapped to one or more prefix lists that are used for networking operations. In some instances, network administrators may create these mappings such that the pools are mapped to prefix lists that express the desired network policy or intent of the network administrators. Additionally, or alternatively, the IPAM system itself may automatically create the mappings between the pools and prefix lists using various information available to the IPAM system. For instance, the resources may be tagged with resources tags that are used to express characteristics of the resources, such as resource type, a purpose of the resource, and/or other information associated with the resources. In a specific example, all the resources in a pool may be tagged with a resource tag that indicates the resources are used by developers, and the IPAM system may determine that the resources are not servicing customer traffic and all traffic external the network that is sent to the pool should be dropped. In such an example, the developer pool may be mapped to a prefix list that is used by firewalls as a deny or drop rule.

In some instances, the types of operations (and/or operations performed in other layers, such as application layer) that can be managed according to the techniques described herein may further include identity operations, such as authentication, authorization, and so forth. For instance, in order for a user or resource to authenticate or authorize with an Identity and Access Management (IAM) system, the IAM system may determine whether an IP address associated with the authentication or authorization request(s) are included in a prefix list. Thus, the IPAM system may monitor a pool of IP addresses that is used to restrict or allow authentication and/or authorization by defining an allow list and/or a reject list. Thus, a user or resource may need credentials as well as a permitted IP address defined in a prefix list to authentication and/or authorize themselves for use of a service or system.

Once the pools are mapped to prefix lists, the prefix lists may be populated with the IP addresses that have been allocated from the pools and for use by resources. The prefix lists may then be propagated to the appropriate networking devices, such as routers, firewalls, and so forth. The IPAM system may then continue to monitor the pools, resources, and usage of IP addresses in the network. The IPAM system may continue to detect changes in IP address usage, such as new allocations of IP addresses, releases of IP addresses, movements of IP addresses between pools, etc., and continually update the pools to reflect the state of IP address usage in the network. As the pools are updated, the updates or changes may be pushed from the IPAM system and to the prefix-management system. The prefix-management system may use the mappings between the pools and prefix lists to update the prefix lists based on the changes or modifications. For instance, the prefix-management system may add IP addresses (e.g., CIDR block(s)) to the prefix lists based on allocations by the IPAM system, remove IP addresses from prefix lists based on releases from resources, move IP addresses between prefix lists, and so forth. Once the changes to the pools have been carried through to the appropriate prefix lists, the prefix-management system may propagate the prefix lists to the appropriate routers, firewalls, and/or other networking devices. The firewalls may then update their access lists and permit or deny traffic using the prefix lists and firewall rules. Further, the routing devices may update their routing tables and route traffic based on the prefix lists, and so forth.

The techniques described herein improve the functioning of computing networks in various ways, such as by improving techniques for monitoring and managing IP address usage in networks. Using the IPAM system, IP addresses can be tracked and managed more effectively, thereby increasing the utilization of IP addresses and reducing waste. Further, the IPAM system acts as a single source of truth for IP address management which reduces errors during IP assignments, overlapping IP address issues, and other issues with IP address management. Additionally, the IP system collects IP-address information across all resources and accounts for a network that is used for tracking IP address utilization, troubleshooting and auditing IP address issues, and other IP address management workflows.

Additionally, the IPAM system works in conjunction with the prefix-management system to ensure that network devices have up-to-date prefix lists to ensure that network policy and intent is appropriately enforced. In this way, the network becomes more secure as firewall devices only allow traffic that is permitted for updated prefix lists. Further, there is less traffic loss in the network as the routing devices are routing traffic to the correct endpoints based on the current state of the IP address usage in the network. Thus, the techniques described herein improve the functioning of computer networks, and the techniques are rooted in networking topology.

The techniques described herein are generally described with respect to a service provider network, such as a cloud provider network or platform. However, the techniques are generally applicable for any network, such as on-premise networks, hybrid networks, and so forth.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an IP address management (IPAM) system 104 monitors the usage of IP addresses across a network, maps changes to prefix lists, and a prefix-management system 106 propagates the updated prefix lists to network devices 108.

As illustrated, a service provider network 102 may be operated and/or managed by a service provider. The service provider network 102 may provide various services to users to fulfil their computing resource needs, such as cloud-based computing resources 105. For example, the service provider network 102 may provide cloud-based, scalable, and network accessible compute power services, storage services, database services, and/or other services. Users may utilize user devices to subscribe for use of the computing resources and/or services provided by the service provider network 102.

The service provider network 102 may span across different geographic regions, and include or be associated with a computing-resource network that includes clusters of managed computing resources (e.g., servers) stored in data centers located across the different geographic regions. In this way, users who have subscribed for use of the network-based services supported by computing resources in the data centers need not invest in and maintain the computing infrastructure required to implement the various services that they may need. In some examples, users of the service provider network 102 may access or utilize computing resources of the computing devices in the data centers located in different geographic regions such that users located in these different geographic regions are provided with access these resources and services.

Generally, the computing resources 105 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing resources 105 may be various types of computing devices, such as devices that have different chip set generations, are from different vendors, have different hardware architectures, and so forth.

Thus, the computing resources 105 can include, for example, any hardware computing device resources, such as processor computing power/capacity, read-only and/or random-access memory, data storage and retrieval systems, device interfaces such as network or peripheral device connections and ports, and the like. In some embodiments, these resources 105 may be dispersed among multiple discrete hardware computing devices (e.g., servers), and these hardware computing devices may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource 105 may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

In some examples, the service provider network 102 may offer or support an IPAM system 104 that may be used to track and manage IP addresses in networks of the users. Network administrators 116 (sometimes referred to herein as "users") can enroll for use of the IPAM system 104 and begin to define how to allocate their inventory of IP addresses 112 for resources in their network. Generally, the IPAM system 104 may perform various operations for managing networks in the IPAM control plane 118. The network administrators 116 may initially create various virtualized domains that can be used to allocate groupings of IP addresses 112. For instance, a network administrator 116 may use IPAM system 104 to create IP spaces for individual networks, or "scopes." Generally, a scope is an IP spaces for a single network and enables the reuse of IP addresses 112 across multiple unconnected networks. The network administrators 116 can define scopes (and/or IPAM system 104 automatically determines scopes) for each network that defines the total IP space allocated for that network. By providing scopes, the IPAM system 104 allows network administrators 116 to reuse IP address spaces across multiple networks. However, because a network cannot have overlapping IP addresses on multiple resources, the scopes allow for reuse of IP address spaces across unconnected networks.

After creating scopes, network administrators 116 may define groupings of IP addresses that are allocated for different resource groups, different teams in an organization, and so forth. These groups of IP addresses are referred to herein as pools 110. Generally, the pools 110 may include collections of contiguous IP address ranges (e.g., CIDR blocks) that are allocated or partitioned for use by different entities. For example, the network administrator 116 may define a pool 110 of IP addresses 112 that are usable by a production team in an organization, and define another pool 110 of IP addresses 112 that are only usable by a developer team in the organization, and so forth. By providing pools, the IPAM system 104 allows network administrators 116 to apply policy on a pool-by-pool basis, thereby allowing network administrators 116 to manage organizational teams differently, resource types differently, user accounts differently, and so forth.

As an example, the network administrators 116 are able to define allocation policies for the pools 110 of IP addresses 112 which define rules for how the IP addresses 112 are allocated to different resources 105, user accounts, and so forth. For instance, an allocation policy may be used to define (i) what user accounts are allowed to request and use IP addresses 112 from certain pools 110, (ii) minimum and maximum amounts of IP addresses 112 (e.g., CIDR blocks) that can be allocated from pools 110, (iii) what resource types are permitted to use IP addresses 112 from pools 110, and so forth. In this way, the network administrators 116 may define and attach different allocation policies across their pools 110 in order to treat organizational entities, resource types, etc., differently regarding IP address 112 allocation. However, by automating the allocation of IP addresses 112 according to defined policy, the IPAM system 104 reduces the latency in providing IP addresses 112 when requested, the chances of overlapping IP addresses 112, and the chance of other errors occurring when allocating IP addresses 112 from pools 110.

Various types of different resources 105 can be allocated IP addresses 112. Generally, a resource 105 is any type of entity that can be allocated an IP address 112, including hardware devices (e.g., servers, routers, switches, VLANs, etc.), and software components, such as virtual machines, containers, subnets, applications, services, and/or any other type of computing resource. In some instances, the resources 105 may be arranged in virtual networks, such as virtual private clouds (VPCs). The resources 105 may be tagged with resource tags that help categorize the resources 105 into resource types. Generally, the resources tags are metadata assigned to the resources 105 and include a user-defined key and value. The resource tags can be used to categorize resources by purpose, owner (e.g., user account), environment, or other criteria.

Once the IP addresses 112 have been assigned to pools 110, pools 110 are assigned to regions, and allocation policies have been assigned to the pools 110, the IPAM system 104 may then begin allocating IP addresses 112 from pools 110 and to resources according to the allocation policies and/or various other policies. The IPAM system 104 may use one or more data structures (e.g., trie data structure, search tree, etc.) to track and maintain the state of unused IP addresses 112, IP addresses 112 that have been allocated by the IPAM system 104, and/or various metadata associated with IP address 112 usage (e.g., utilization metrics for pools, policies, alerts, threshold, remedial actions, etc.). The IPAM system 104 may update the data structures to indicate the state of the IP address 112 usage in the network(s), or at least what the IPAM system 104 believes the current state of IP address usage is in the networks.

The service provider network 102 may also include, in addition to the resources 105 in the data plane 120, network devices 108 that use the IP addresses 112 to perform various networking operations. For instance, firewall devices 108 allow and/or deny traffic communicated between devices based on lists of IP addresses 112, routing devices 108 maintain route tables that use IP addresses 112 as a means to communicate data to appropriate destination devices, and so forth. As IP address usage in a network changes, the network devices 108 must be apprised of these changes or undesirable results can occur. As an example, firewall devices 108 may allow traffic to reach destination resources 105 that is not secure or permitted, routing devices 108 may route traffic to the incorrect places that results in packet loss, and so forth.

The service provider network 102 may further include or provide a prefix-management system 106 that works in conjunction with the IPAM system 104 to monitor the usage of IP addresses 112 in networks of computing resources 105 and automatically notify networking devices 108 when IP address 112 usage has changed. The IPAM system 102 may create pools 110 of IP addresses 112 (e.g., address groups), and may work with the prefix-management system 106 to map those pools to prefix lists 132 that are distributed to the networking devices 108. The IPAM system 104 may include an allocation component 122 that performs techniques for allocating the IP addresses 112 from pools 110 and to resources 105. The IPAM system 104 may further include a monitoring component 124 monitor changes in IP address 112 usage by resources 105 in the networks (e.g., allocations and releases of IP addresses 112), update the pools 110 that are affected by the changes, carry those changes through to the appropriate prefix lists 132, and propagate updated prefix lists 132 to the networking devices (e.g., firewall devices, routing devices, etc.). In this way, the IPAM system 104 may automatically identify and apply IP address 112 changes to prefix lists 132 that are used for networking operations in the networks.

Thus, the service provider network 102 may support the prefix-management system 106 that allows network administrators 116 to configure and maintain prefixes lists 132 (e.g., a set of one or more CIDR blocks) that are used for various networking operations. For instance, the prefix-management system may use prefix lists 132 for applying security policy (e.g., access control lists (ACLs) of firewalls 108), defining routes (e.g., routing tables for routing devices 108), and so forth. In this way, as networks of resources 105 scale, the prefix lists 132 may be used to apply consistent network policy on network traffic and for network operations for large groups of resources 105 rather than referencing resources individually.

However, as noted above, IP addresses 112 are continuously being allocated to resources 105, released from use by resources 105, moved between pools 110, recycled, and so forth. Accordingly, as IP address 112 usage changes, the prefix lists 132 that are used by networking devices 108 may become out-of-sync with respect to the intent and policy of network administrators 116. That is, traffic from devices may be allowed by firewall devices 108 that should have been denied, traffic may be routed to the incorrect destination devices, and so forth. Thus, the prefix lists 132 must be updated to ensure that networking operations are consistent with the state of IP address allocation and network policy or intent.

The techniques described herein include harnessing the IPAM system's 104 ability to automatically monitor IP address 112 usage in networks using pools 110, and mapping the changes made to the pools 110 of IP addresses 112 to prefix lists that are managed by the prefix-management system 106. To initiate the process, the IPAM system and prefix-management system 106 may map pools 110 to different prefix lists 132 according to network intent or policy. For instance, the prefix-management system 106 may include a mappings component 126 that receives pool information from the IPAM system 104, and creates mappings 128 of pools to prefix lists. As a specific example, a set of resources 105 that have IP addresses 112 allocated from a same pool 110 may be managed by a testing team of an organization, and all traffic from customer devices is to be dropped and not sent to the set of resources 105. In this example, the pool 110 may be mapped to a prefix list 132 that is used for enforcing security policies by firewall devices 108. The prefix list 132 may be updated to include the IP addresses 112 allocated to the testing resources 105 from the pool 110, and propagated to firewall devices 108 by a propagation component 130 where a deny rule can be applied to all traffic on that prefix list.

To harness the monitoring abilities of the IPAM system 104 on behalf of the prefix-management system 106, the pools 110 may initially be mapped to one or more prefix lists 132 in the mappings 128 that are used for networking operations. In some instances, network administrators 116 may create these mappings 128 such that the pools 110 are mapped to prefix lists 132 that express the desired network policy or intent of the network administrators 116. Additionally, or alternatively, the IPAM system 104 itself may automatically create the mappings 128 between the pools 110 and prefix lists 132 using various information available to the IPAM system 104. For instance, the resources 105 may be tagged with resources tags that are used to express characteristics of the resources 105, such as resource type, a purpose of the resource 105, and/or other information associated with the resources 105. In a specific example, all the resources 105 in a pool may be tagged with a resource tag that indicates the resources 105 are used by developers 116, and the IPAM system 104 may determine that the resources 105 are not servicing customer traffic and all traffic external the network that is sent to the pool 110 should be dropped. In such an example, the developer pool 110 may be mapped to a prefix list 132 that is used by firewalls 108 as a deny or drop rule.

Once the pools 110 are mapped to prefix lists 132, the prefix lists may be populated with the IP addresses that have been allocated from the pools and for use by resources. The prefix lists 132 may then be propagated to the appropriate networking devices 108, such as routers, firewalls, and so forth. The IPAM system 104 may then continue to monitor the pools 110, resources 105, and usage of IP addresses 112 in the network. The IPAM system 104 may continue to detect changes in IP address 112 usage, such as new allocations of IP addresses 112, releases of IP addresses 112, movements of IP addresses 112 between pools 110, etc., and continually update the pools 110 to reflect the state of IP address 112 usage in the network. As the pools 110 are updated, the updates or changes may be pushed from the IPAM system 104 and to the prefix-management system 106. The prefix-management system 106 may use the mappings 128 between the pools 110 and prefix lists 132 to update the prefix lists 132 based on the changes or modifications. For instance, the prefix-management system 106 may add IP addresses 112 (e.g., CIDR block(s)) to the prefix lists 132 based on allocations by the IPAM system 104, remove IP addresses 112 from prefix lists 132 based on releases from resources 105, move IP addresses 112 between prefix lists 132, and so forth. Once the changes to the pools 110 have been carried through to the appropriate prefix lists 132, the prefix-management system 106 may propagate the prefix lists 132 to the appropriate routers, firewalls, and/or other networking devices 108. The firewalls 108 may then update their access lists 132 and permit or deny traffic using the prefix lists 132 and firewall rules. Further, the routing devices 108 may update their routing tables and route traffic based on the prefix lists 132, and so forth.

The techniques described herein are generally described with respect to a service provider network, such as a cloud provider network or platform. However, the techniques are generally applicable for any network, such as on-premise networks, hybrid networks, and so forth.

The users/administrators 116 may create user accounts with the service provider to utilize the resources and services of the service provider network 102. The users 116 and administrators 116 may utilize their devices to communicate over one or more networks 114 (e.g., WANs, PANs, LANs, etc.) with the service provider network 102. The user devices may comprise any type of computing device configured to communicate over network(s) 114, such as mobile phones, tablets, laptop computers, desktop computers, televisions, servers, and/or any other type of computing device. The users 116 and administrators 116 may interact with the service provider network 102, via their user account and/or one or more user portals (e.g., web console, command line interface (CLI), application programming interface (API), etc.). The user portals may provide input data to the IPAM system 104 to perform various techniques described herein for managing networks, defining policies, reconciling differences, and so forth.

Generally, the IPAM system 104, the prefix-management system 106, and components thereof, may comprise software, firmware, and/or other logic that is supported one computing device, or across more computing devices in the service provider network 102. Additionally, the IPAM system 104 and/or prefix-management system 106 may comprise a system of other devices. Although illustrated as being at least partially separate systems, the IPAM system 104 and the prefix-management system 106 may be a same device and/or a same system.

Figure 2:
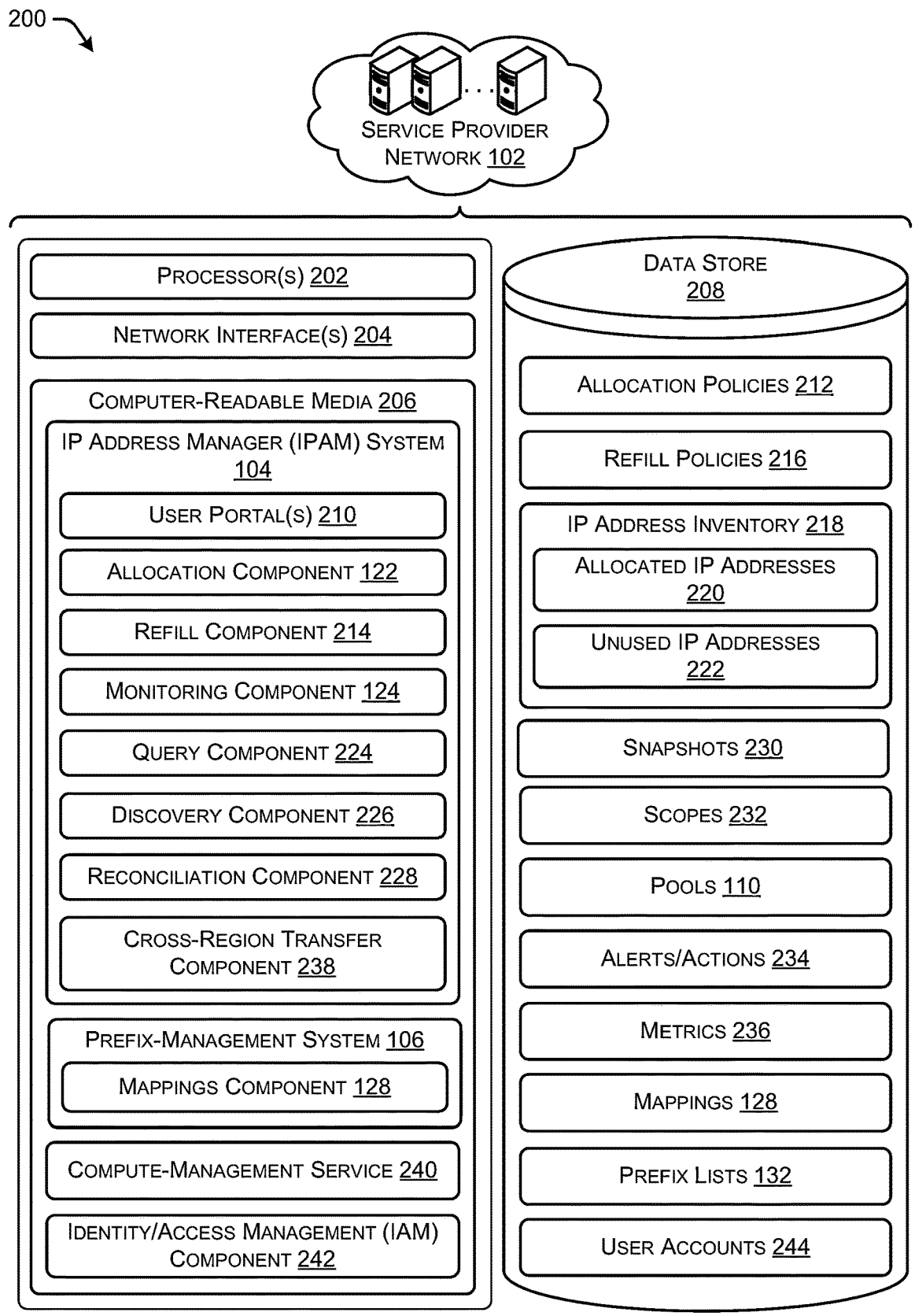
FIG. 2 illustrates a component diagram of example components of a service provider network that includes an IPAM system that monitors the usage of IP addresses in one or more networks and a prefix-management system that propagates updated prefix lists.

FIG. 2 illustrates a component diagram 200 of example components of a service provider network 102 that includes an IPAM system 104 that monitors the usage of IP addresses 112 in one or more networks and a prefix-management system 106 that propagates updated prefix lists 132.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s), and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the IPAM system 104 described herein. For instance, the computer-readable media 206 may store and/or provide user portal(s) 210 through which users 116 and administrators 116 can provide input via their user accounts and user devices. In some examples, the user portal(s) 210 include an interface through which users 116 and administrators 116 can define policies or rules for their IP address workflows. Additionally, the user portal(s) 210 may present one or more console user interface(s) (or UIs) through which the users 116 and administrators 116 may provide input data that defines or describes policies for their IP addresses 112. The user portal(s) may receive calls from APIs, CLIs, SDKs, and/or other electronic means or methods. The users/administrators 116 may observe various metrics or other information associated with IP address 112 usage via the portals 210.

The IPAM system 104 may further store or include an allocation component 122 that manages the allocation of IP addresses 112 and allows administrators 116 to define allocation policies 212. As an example, the network administrators 116 may define allocation policies 212 for the pools 110 of IP addresses 112 which define rules for how the IP addresses 112 are allocated to different resources, user accounts, and so forth. For instance, an allocation policy 212 may be used to define (i) what user accounts are allowed to request and use IP addresses 112 from certain pools 110, (ii) minimum and maximum amounts of IP addresses 112 (e.g., CIDR blocks) that can be allocated from pools 110, (iii) what resource types are permitted to use IP addresses 112 from pools 110, and so forth. In this way, the network administrators 116 may define and attach different allocation policies 212 across their pools in order to treat organizational entities, resource types, etc., differently regarding IP address allocation. However, by automating the allocation of IP addresses 112 according to defined policy, the IPAM system 104 reduces the latency in providing IP addresses when requested, the chances of overlapping IP addresses 112, and the chance of other errors occurring when allocating IP addresses 112 from pools 110.

The computer-readable media 206 may further store a refill component 214 that allows network administrators 116 to define refill policies 216 that are used to refill the pools 110 with IP addresses 112. As IP addresses 112 are withdrawn or allocated from pools 110, the inventory of available or unused IP addresses 112 may diminish. To prevent pools 110 from exhausting available IP addresses 112, the network administrators 116 may further define refill policies 216 for the pools 110 that provide rules regarding how pools 110 replenish their IP address 112 supply. For instance, network administrators 116 may define refill policies 216 that indicate minimum thresholds (e.g., 5% available, 1,000 IP addresses available, etc.) at which to replenish IP address 112 supply, parent pools 110 from which to withdraw IP addresses 112 to refill the pools 110, amounts of IP addresses 112 withdrawn when replenishing IP address 112 supply, and so forth. Similarly, network administrators 116 can define refill policies 216 for pools 110 that define who can refill from the pools 110 and how many IP addresses 112 can be taken from the pools 110. For instance, the network administrators 116 can list what child pools 110 are permitted to refill from a particular parent pool 110, minimum, maximum, and default amounts of IP addresses 112 that can be withdrawn, frequency at which IP addresses 112 can be withdrawn, and so forth.

The computer-readable media 206 may further store the monitoring component 124 which generally manages the IP address inventory 218 and tracks allocated IP addresses 220, unused IP addresses 222 for pools 110, and/or other information and metadata. The monitoring component 124 may determine the tracked state of IP address 112 usage in networks using data structure(s) that are included in or associated with the IP address inventory 218.

The computer-readable media 206 may further store a query component 224 that allows users 116 and administrators 116 to submit queries that are exposed by the IPAM system 104. The query component 224 may allow for queries such as longest-prefix match queries, historical searches, drilling down by CIDR into a scope 232, visualizing what is in a pool 110, and so forth. Additional details around the types of queries submitted are found below with respect to FIGS. 3-10.

The computer-readable media 206 may further store a discovery component 226 that is generally is in charge of finding out about all of the resources, subnets, and so on that are in a users' organization, and sending that data to the reconciliation component 228. The reconciliation component 228 may be configured to map the truth from the discovery component 226 into actions on the IPAM system's 104 data store 208. For example, during an initial onboarding, the reconciliation component 228 might backfill a bunch of allocations into various pools. As another example, when a resource is deleted, the reconciliation component 126 will release the allocation object from the IPAM system 104. As a third example, if during onboarding the discovery component 226 finds that there are two resources that have overlapping space, the reconciliation component 126 may create a notification or alert that is sent to an administrator 116 to notify them that something is wrong, and an action may need to be taken. The computer-readable media may further store a cross-region transfer component 238 that initiates cross-regional transfers of resources and/or IP addresses 112.

The computer-readable media 206 may further store code for a compute-management service 240, which may be implemented by one, or multiple, computing devices of the service provider network 102. Generally, the compute-management service 240 may be a service of the service provider network 102 that provides secure, resizable compute capacity and manages the computing resources of the computing-resource network. The compute-management service 240 may be referred to in various implementations as an elastic compute service, a virtual machines service, a computing cloud service, a compute engine, or a cloud compute service. In some examples, the compute-management service 240 may perform various functions for managing the computing-resource network, such as provisioning resources, migrating resources, providing auto-scaling for fleets of resources, configuring resources, and/or performing any other functions for managing the resources. In some instances, the compute-management service 240 may receive commands from the IPAM system 104 for managing the resources.

To utilize the services provided by the service provider network 102, administrators 116 and users 116 may register for an account with the service provider network 102. For instance, administrators 116 and users 116 may utilize a user device to interact with an identity and access management (IAM) component 238 that allows the administrators 116 and users 116 to create user accounts 244 with the service provider network 102. Generally, the IAM component 242 may enable the administrators 116 and users 116 to manage their IP address 112 allocation and computing resources securely. Using the IAM component 242, the administrators 116 and users 116 may manage their IP address 112 allocations, assignments, utilization metrics, compliance statutes, and so forth as described herein. Generally, the different user accounts 244 can assume different roles, or sets or permissions/credentials, that allow network administrators 116 and users 116 to perform different actions, and be restricted from performing some actions.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3A:
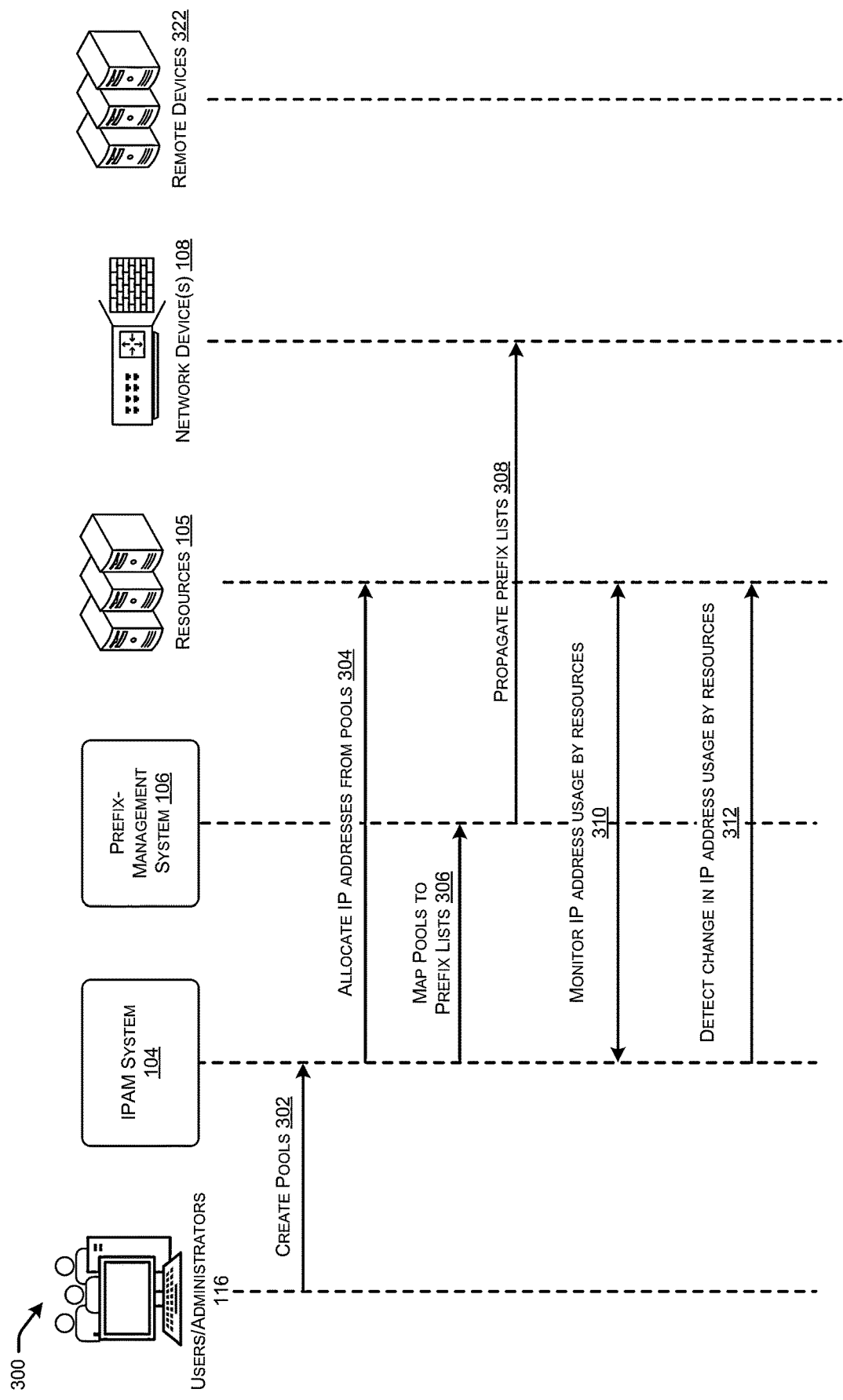
FIGS. 3A and 3B collectively illustrate a sequence diagram of an example process for an IPAM system to monitor IP address usage in one or more networks, map pools of IP addresses to prefix lists, and propagate updated prefix lists to network devices based on changes in IP address usage.
Figure 3B:
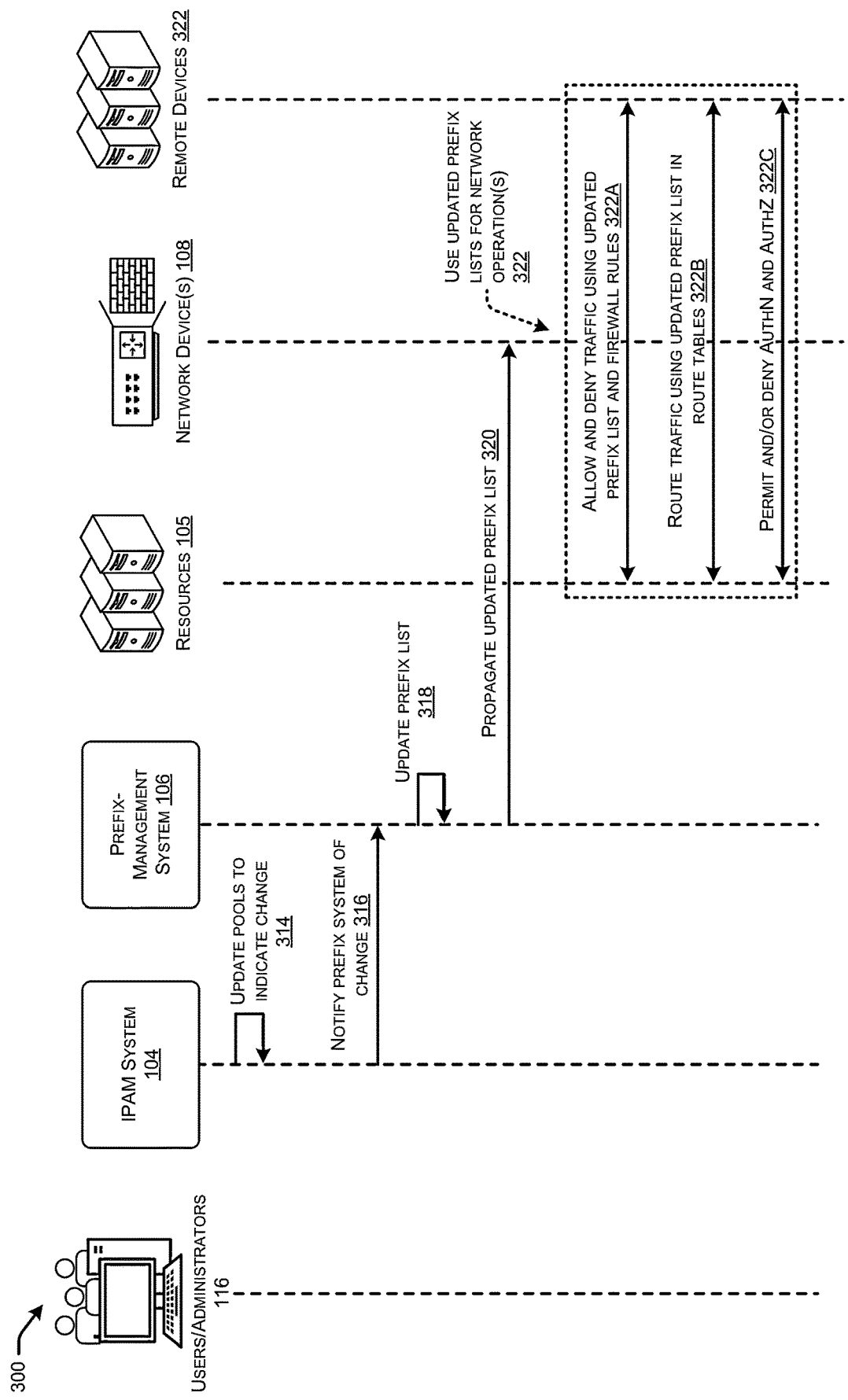

FIGS. 3A and 3B collectively illustrate a sequence diagram 300 of an example process for an IPAM system 104 to monitor IP address 112 usage in one or more networks, map pools of IP addresses 112 to prefix lists 132, and propagate updated prefix lists 132 to network devices 108 based on changes in IP address 112 usage.

At 302, an administrator 116 may create one or more pools 110, which are generally address groups of IP addresses 112. For instance, the network administrator 116 may assign IP addresses (e.g., CIDR blocks) to pools for use by resources that are permitted to use IP addresses 112 from the pools 110.

At 304, the IPAM system 104 may allocate IP addresses 112 to resources 105 according to an allocation policy 212. For instance, the resources 105 may send requests (and/or use accounts 244) for IP addresses 112, and those requests may be permissible under the pools 110 allocation policies 212.

At 306, the IPAM system 104 may map the pools 110 to one or more prefix lists 132 such that the prefix lists 132 are populated with allocated IP addresses 112 from the pools 110.

At 308, the prefix-management system 106 may propagate the prefix lists 132 to the network devices 108. For instance, the propagation component 130 may send prefix lists 132 to the network devices 108 that use them, and/or the network devices 108 may subscribe for the prefix lists 132 that they use for networking operations.

At 310, the IPAM system 104 may monitor IP address 112 usage by resources 105. For instance, the IPAM system 104 may determine what IP addresses 112 have been allocated, what IP addresses 112 have been released by resources 105, and so forth.

At 312, the IPAM system 104 may detect a change in IP address 112 usage by resources 105. The change may be an allocation of an IP address 112 to a resource 105, a release of an IP address 112 from being used by a resource 105, movement of IP addresses 112 between pools 110, and so forth.

At 314, the IPAM system 104 may update pools 110 to indicate the change.

At 316, the IPAM system 104 may notify the prefix-management system 106 of the change in the pool 110. For instance, the IPAM system 104 may send an indication of the changes (e.g., deltas), and/or may send updated inventories for the pools 110.

At 318, the prefix-management system 106 may update the prefix list 132 based on the change in the pool 110. For instance, the prefix-management system 106 may add IP addresses 112 to the lists 132, remove IP addresses 112 from the list 132, and so forth. At 320, the prefix-management system 106 may propagate the updated prefix list 132 to the appropriate network devices 108.

At 322, the network devices 108 may use the updated prefix lists 132 to perform various network operations, such as allowing and denying traffic at 322A, routing traffic using updated prefix list 132 in route tables at 322B, permitting and/or denying authentication and/or authorization requests from users/resources/devices at 322C, and so forth.

Figure 4A:
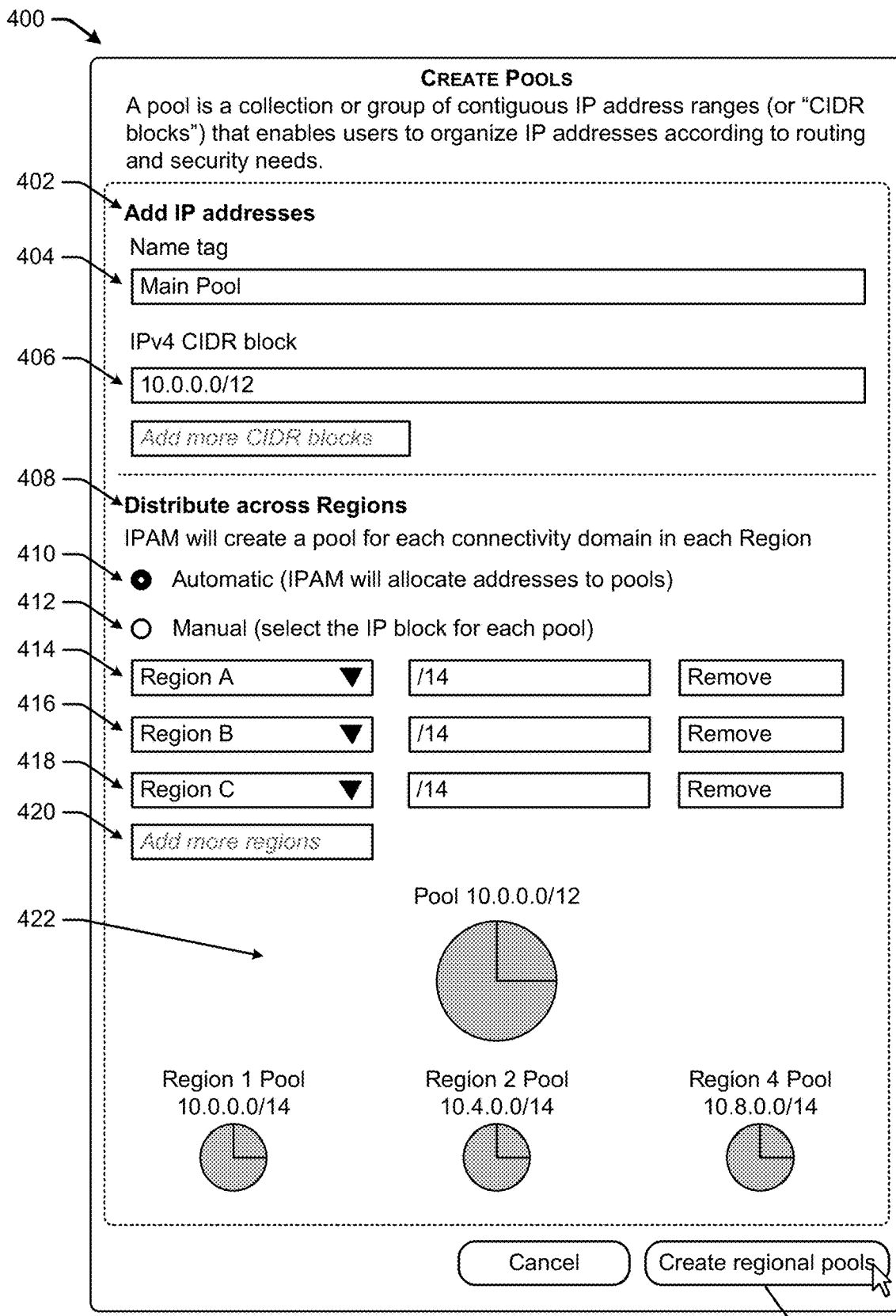
FIG. 4A illustrates a graphical user interface through which an administrator of a network can create regional pools of IP addresses.

FIG. 4A illustrates a graphical user interface 400 through which an administrator 116 of a network can create regional pools 110 of IP addresses 112.

It should be understood that the GUI 400 is merely illustrative and any type of user interface, or combination of user interfaces, may be utilized to prompt an administrator 116 to create regional pools, which may be root pools 110 in some instances. Additionally, any type of input mechanism may be used to receive input that can be used to make selections.

As illustrated, the administrator 116 may be presented with an add IP addresses field 402 in which the administrator 116 may define a name tag 404 for the pool they are creating, as well as assign the IPv4 (and/or IPv6) CIDR blocks 406 to the pool. The administrator 116 may also be presented with a distribute across regions field 408 in which the administrator 116 can select between an automatic option 410 where IPAM system 104 will allocated addresses to the pools, or a manual option 412 where the administrator 116 can manually select IP blocks for each pool. As illustrated in this example, there is region A 414, region B 416, and region C 416, and the administrator 116 would like IPAM system 104 to create a pool for each connectivity domain for the regions. In the illustrated example, the regional pools are provided with IP addresses 112 using CIDR blocks of 10.0.0.0/14 from the root or parent pool.

The GUI 402 may further illustrate a pool diagram 422 that illustrate what pools are going to be created by the administrator 116 upon selecting the create regional pools option 426.

Figure 4B:
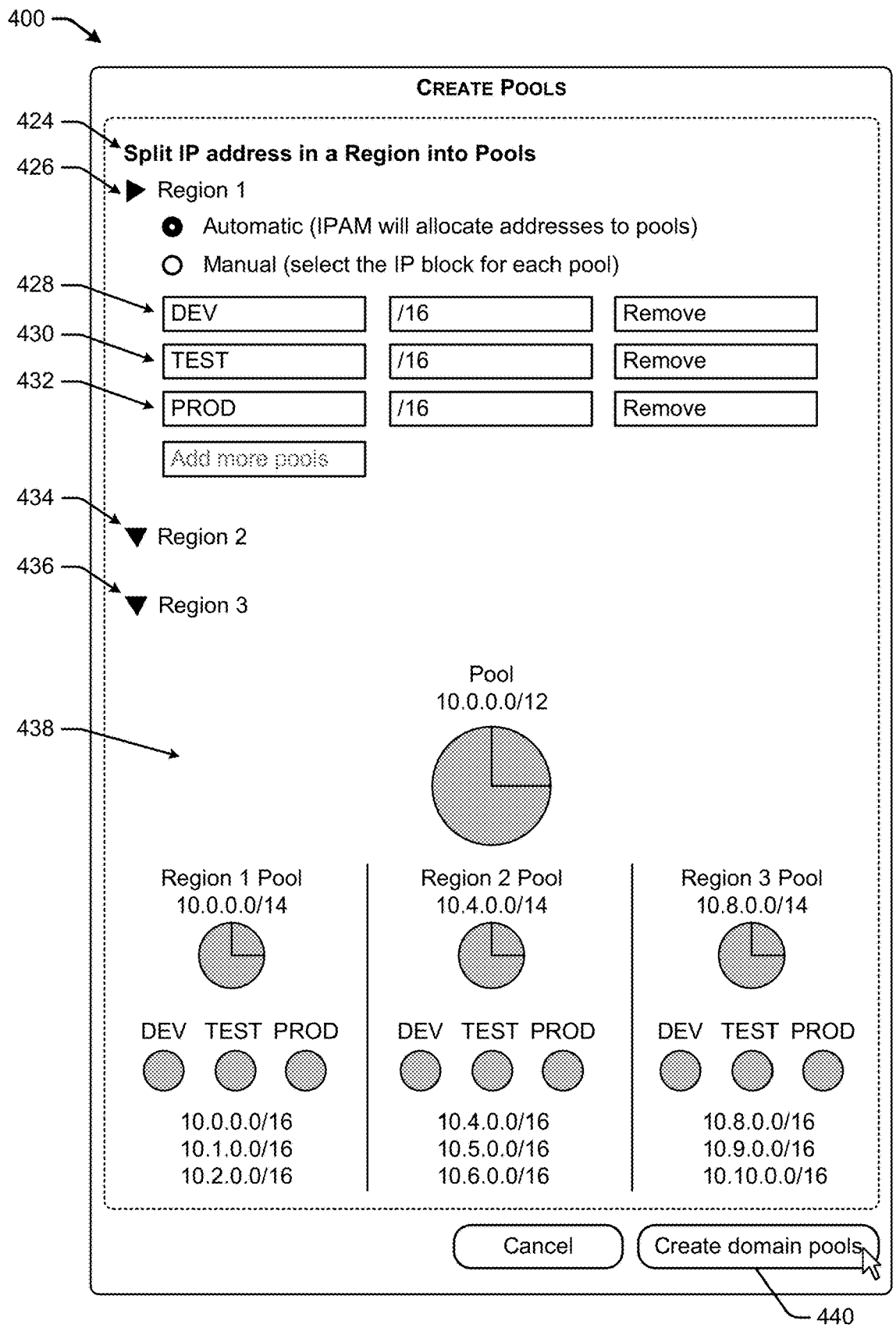
FIG. 4B illustrates a graphical user interface through which an administrator of a network can create root pools of IP addresses.

FIG. 4B illustrates a graphical user interface 300 through which an administrator 112 of a network can create root pools of IP addresses.

At illustrated, the GUI 400 may include a field 424 in which the administrator 116 can split IP address 112 in a region into pools 110. In the region 1 option 426, the administrator 116 can select the automatic option where the IPAM system 104 may allocate the addresses 112 to the pools 110. As shown, the administrator 116 has created a developer 428 pool, a testing pool 430, and a production pool 432 that are all sub-pools from the regional pool(s). Additionally, options 434 and 436 are available for the administrator 116 to provide pool input for region 2 and region 3 pools. As illustrated, the GUI 400 may include a pool diagram 438 that illustrates the pools that have been created, and the administrator 116 may select the create domain pools option 440 to create the domain pools that were defined in the GUI 400. In this way, the administrator 116 may see how the pools 110 will look in deployment prior to creating the domain pools.

Figure 5:
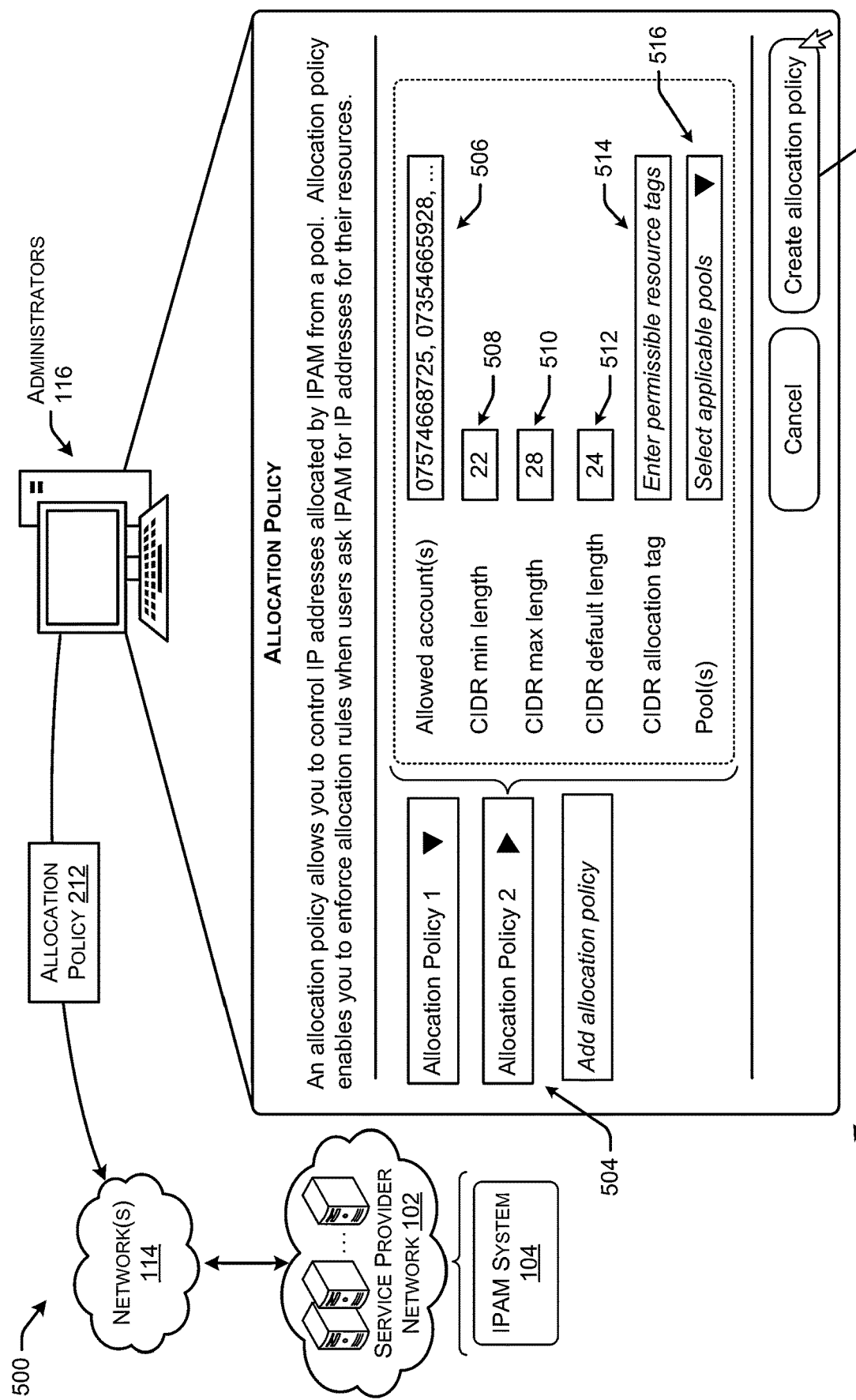
FIG. 5 illustrates a graphical user interface through which an administrator of a network can create an allocation policy for allocating IP addresses to resources.

FIG. 5 illustrates a graphical user interface 502 through which an administrator 116 of a network can create an allocation policy 122 for allocating IP addresses 112 to resources 105.

The user interface 502 can include allocation policy icons 504 that allow the administrator 116 to define different allocation policies 212 that may be attached to different pools 110. As shown, the allocation policy 212 may include various rules that define whether requests for IP addresses 112 from pools 110 should be allowed or denied. An allocation policy field 504 may include an allowed account rule 506 that indicates what accounts are allowed to use IP addresses 112 from the pools 110. Additionally, the allocation policy field 504 may include a CIDR min length field 508, a CIDR max length field 510, and a CIDR default length field 512 where the administrator 116 can set the maximum, minimum, and default lengths of CIDR blocks that can be allocated at once from the pools 110. Additionally, the allocation policy field 504 may include a CIDR allocation tag field 514 that allows the administrator 116 to define what resource tags, and thus types of resources 105 (and/or purposes of the resources 105), can use IP addresses 112 from the pools 110. Additionally, the allocation policy field 504 can include a pools field 516 that allows the administrator 116 to define to which pools 110 the allocation policy 212 is assigned. The administrator 116 may then select the create allocation policy option 518, and the allocation policy 212 may be assigned to the appropriate pools 110 and implemented by the IPAM system 104. The allocation policy 212, or policies 212, created by the administrator 116 may then, once created using 518, be send to the IPAM system 104 via the user portal 210, for instance.

Figure 6:
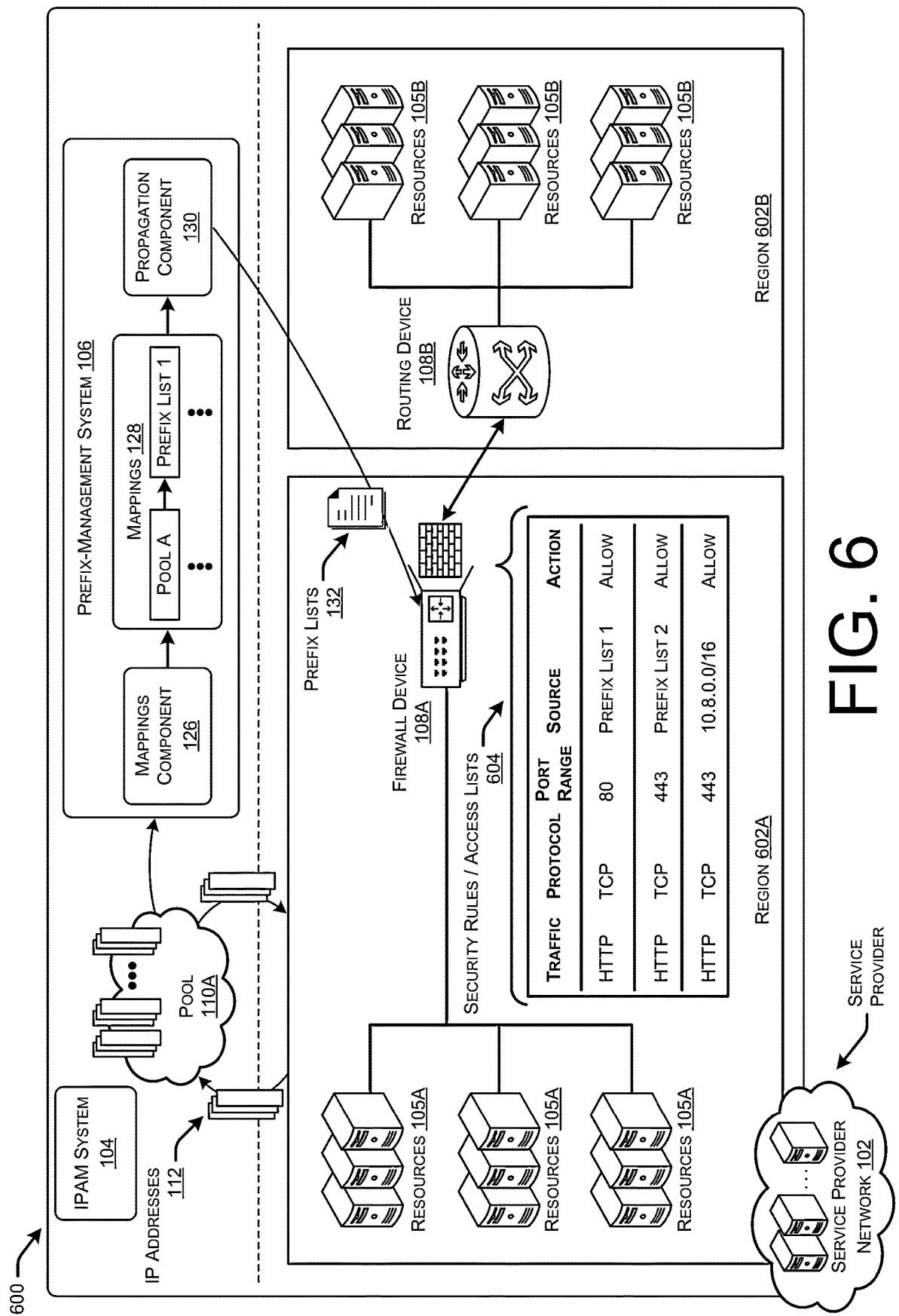
FIG. 6 illustrates a system-architecture diagram of an example environment in which a pool is mapped to a prefix list, updates are made to the prefix list based on changes made to the pool, and updated prefix lists are propagated to a firewall device for use in an access list.

FIG. 6 illustrates a system-architecture diagram of an example environment 600 in which a pool 110 is mapped to a prefix list 132, updates are made to the prefix list 132 based on changes made to the pool 110, and updated prefix lists 132 are propagated to a firewall device 108 for use in an access list.

As shown, the IPAM system 104 may control how IP addresses 112 are allocated from pool 110A and to resources 105A in a region 602A of the service provider network 102. For instance, the IP addresses 112 may be allocated to the resources 105A according to an allocation policy 212. In some instances, a network administrator 116 of the network(s) illustrated may map the pool 110 to a prefix list 1 (132) such that the allocated IP addresses 112 of the pool 110 will be included in the prefix list 132. When changes are made to the pool 110A allocations, the IPAM system 104 may push the changes to the prefix-management system 106 and the mappings 128 may be updated (e.g., allocated IP addresses from the pool 110A are added to the prefix list 1) by the prefix-management system 106.

For instance, the IPAM system 104 (e.g., allocation component 122) may allocate IP addresses 112 from the pool 110A and according to an allocation policy 212, and the monitoring component 124 may track the allocated and released IP addresses 112. The IPAM system 104 may notify the prefix-management system 106 that additional IP address(es) 112 have been allocated since the last time a prefix list 132 was updated and distributed. The mappings component 126 may update the mappings 128 such that the new pool 110A information is populated into the prefix list 1, and the propagation component 130 may then propagate the updated prefix list(s) 132 to the network devices 108, such as the firewall device 108A. As shown, the firewall device 108A may have security rules/access lists 604 that use the prefix lists 132 in order to allow or deny traffic communicated between the resources 105A and other devices. The updated prefix lists 132 may be "sources" in the rules 604, and traffic sent from (and potentially to) the IP addresses 112 in the prefix lists 132 may be allowed and/or denied based on the rules 604.

Figure 7:
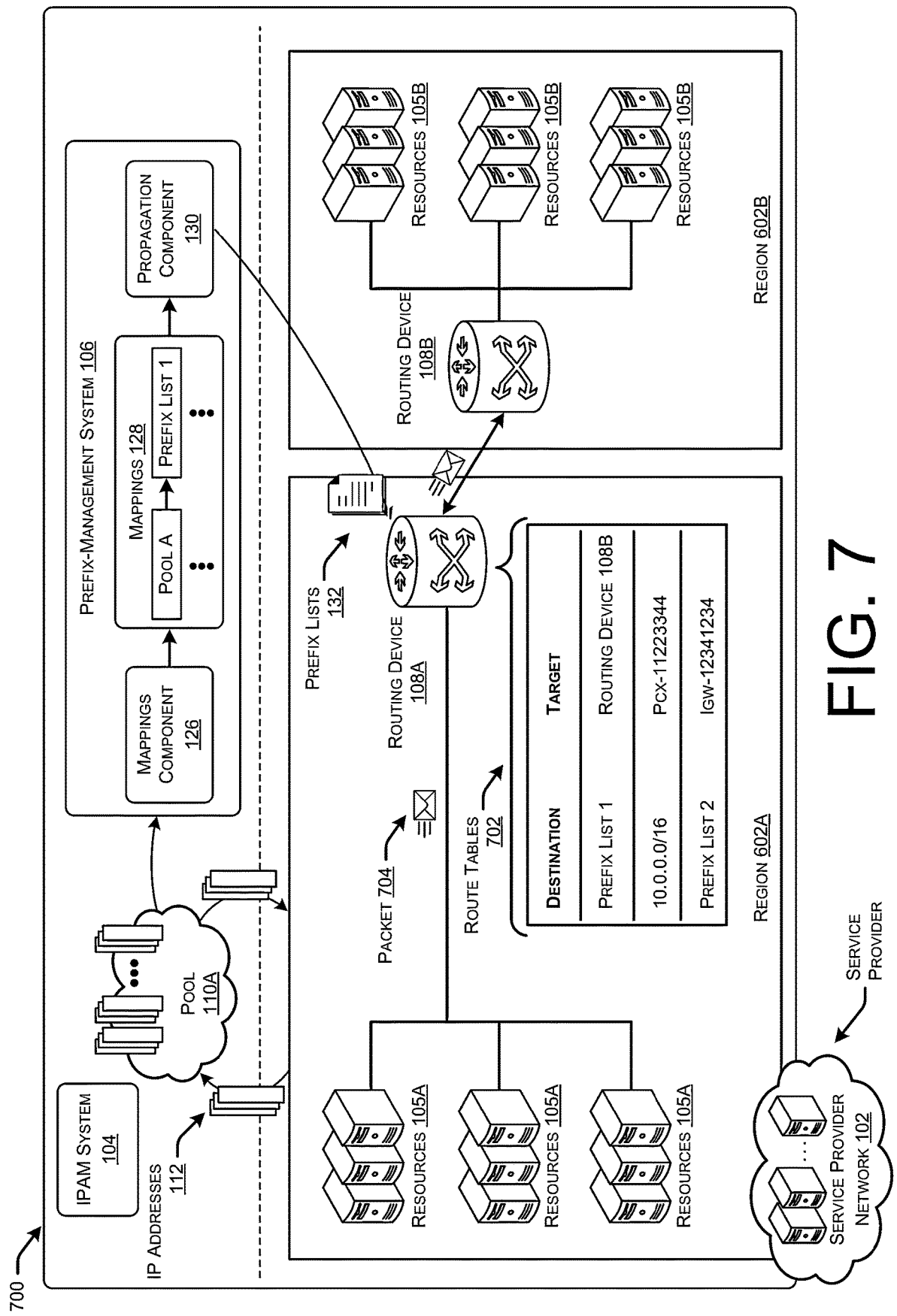
FIG. 7 illustrates a system-architecture diagram of an example environment in which a pool is mapped to a prefix list, updates are made to the prefix list based on changes made to the pool, and updated prefix lists are propagated to a routing device for use in a route table.

FIG. 7 illustrates a system-architecture diagram of an example environment 700 in which a pool 110 is mapped to a prefix list 132, updates are made to the prefix list 132 based on changes made to the pool 110, and updated prefix lists 132 are propagated to a routing device for use in a route table.

As shown, the IPAM system 104 may control how IP addresses 112 are allocated from pool 110A and to resources 105A in a region 602A of the service provider network 102. For instance, the IP addresses 112 may be allocated to the resources 105A according to an allocation policy 212. In some instances, a network administrator 116 of the network(s) illustrated may map the pool 110 to a prefix list 1 (132) such that the allocated IP addresses 112 of the pool 110 will be included in the prefix list 132. When changes are made to the pool 110A allocations, the IPAM system 104 may push the changes to the prefix-management system 106 and the mappings 128 may be updated (e.g., allocated IP addresses from the pool 110A are added to the prefix list 1) by the prefix-management system 106.

For instance, the IPAM system 104 (e.g., allocation component 122) may allocate IP addresses 112 from the pool 110A and according to an allocation policy 212, and the monitoring component 124 may track the allocated and released IP addresses 112. The IPAM system 104 may notify the prefix-management system 106 that additional IP address(es) 112 have been allocated since the last time a prefix list 132 was updated and distributed. The mappings component 126 may update the mappings 128 such that the new pool 110A information is populated into the prefix list 1, and the propagation component 130 may then propagate the updated prefix list(s) 132 to the network devices 108, such as the routing device 108A. As shown, the routing device 108A may maintain and/or store one or more route tables 702 that are used to route packets 704 between devices. The prefix lists 132 may be used for routing purposes, such as determining a next-hop target in the route table 702 for traffic having a destination address that falls within the prefix list 1.

FIGS. 8A, 8B, 9, and 10 illustrate flow diagrams of example methods 800, 900, and 1000 that illustrate aspects of the functions performed at least partly by the service provider network 102 as described in this disclosure. The logical operations described herein with respect to FIGS. 8A, 8B, 9, and 10 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 8A, 8B, 9, and 10 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 8A:
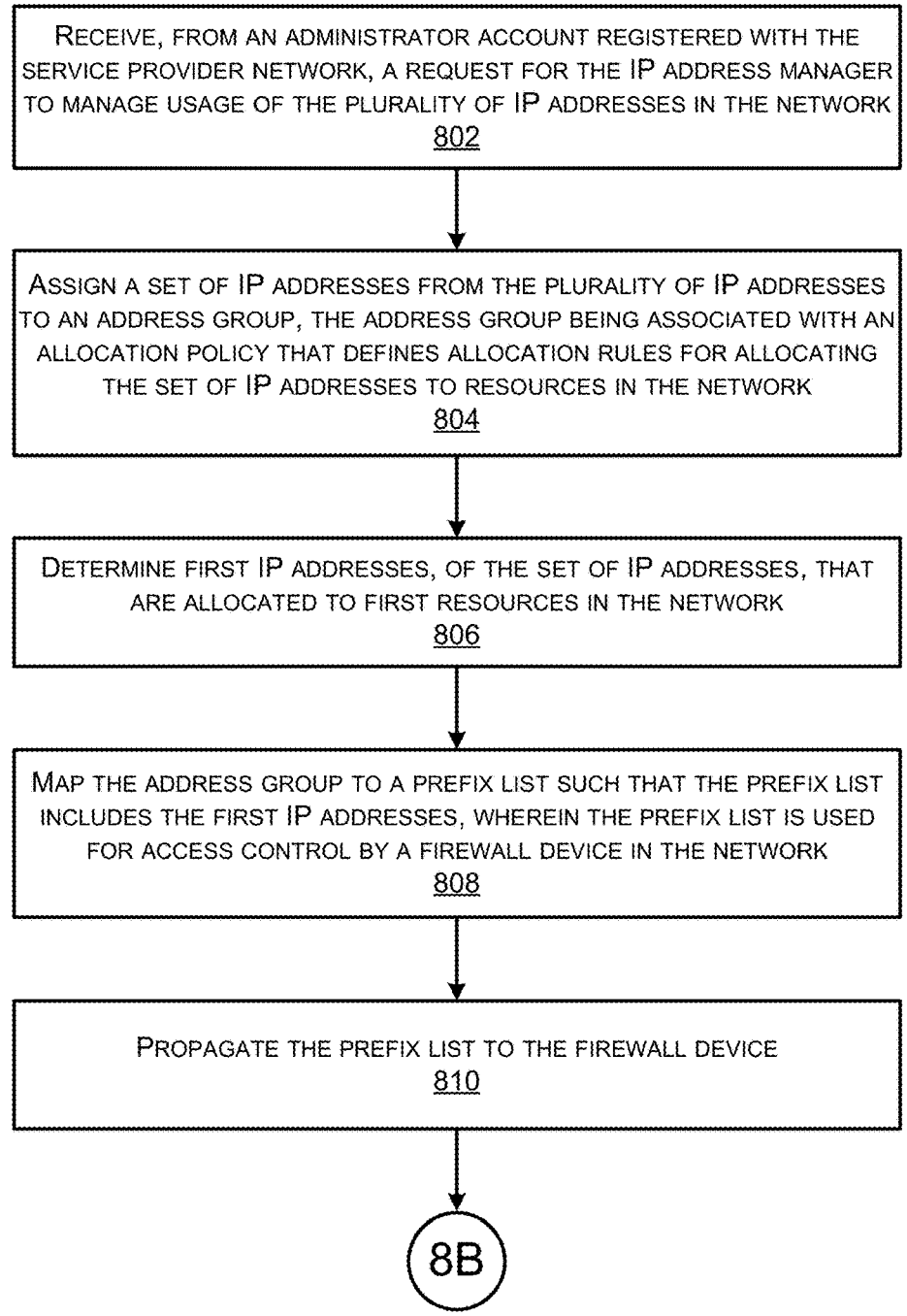
FIGS. 8A and 8B collectively illustrate a flow diagram of an example method for a system to map an address group to a prefix list, allocate an IP address to a resource, update the prefix list to reflect the allocation, and propagate an updated prefix list to a firewall device.
Figure 8B:
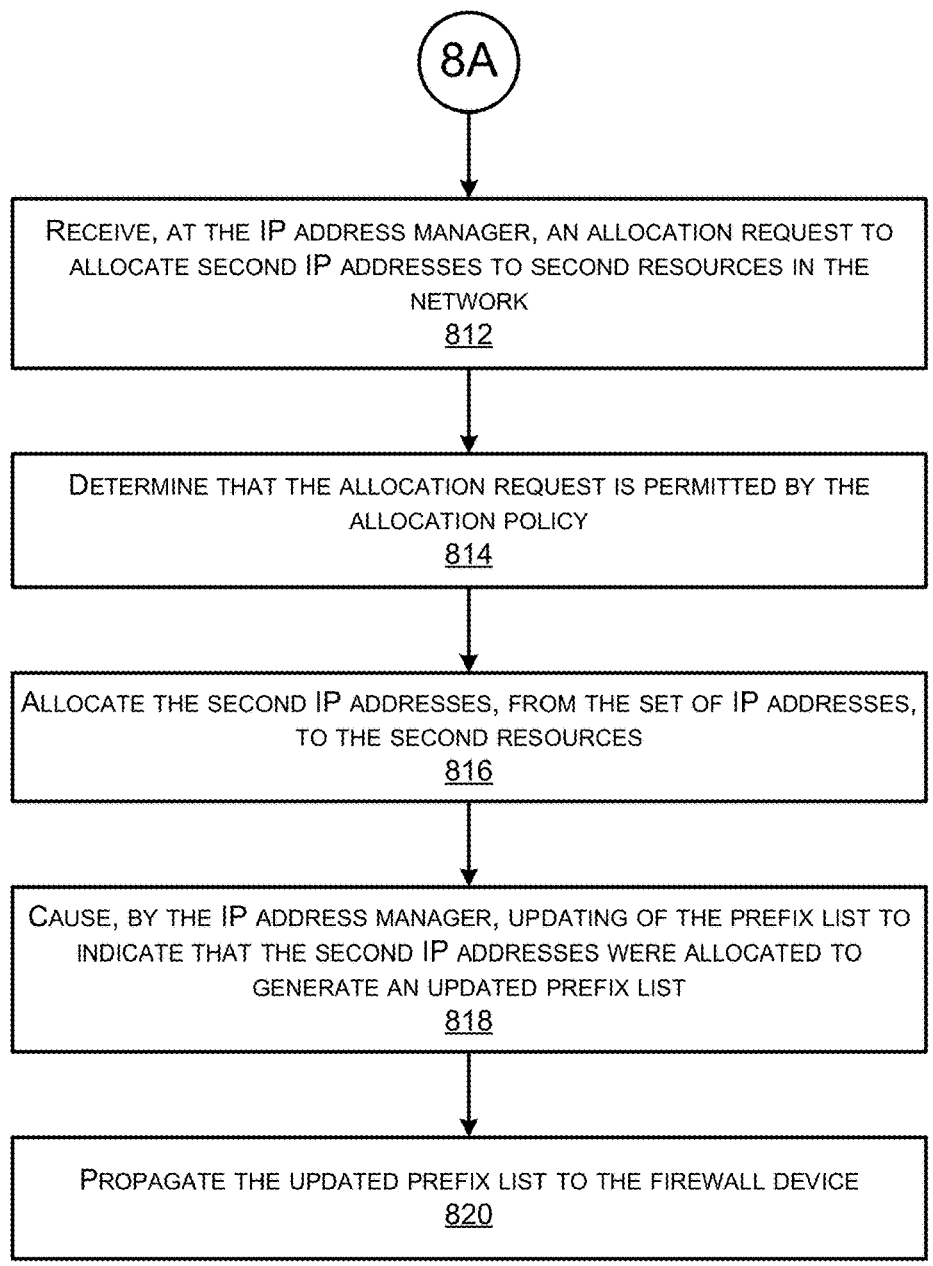

FIGS. 8A and 8B collectively illustrate a flow diagram of an example method for a service provider network to map an address group to a prefix list, allocate an IP address to a resource, update the prefix list to reflect the allocation, and propagate an updated prefix list to a firewall device.

At 802, the service provider network may receive, from an administrator account registered with the service provider network, a request for the IP address manager to manage usage of the plurality of IP addresses in the network. For instance, an administrator account 244 may request that the service provider network 102 utilize the IPAM system 104 to manage use of the plurality of IP addresses 112 in a network of resources 105 associated with the administrator account 244.

At 804, the service provider network may assign a set of IP addresses from the plurality of IP addresses to an address group. For instance, a set of IP addresses 112 (e.g., one or more CIDR blocks) may be assigned to an address group (e.g., pool 110) that is associated with an allocation policy 212 that defines allocation rules for allocating the set of IP addresses 112 to resources 105 in the network.

At 806, the service provider network may determine first IP addresses, of the set of IP addresses, that are allocated to first resources in the network. For instance, the IPAM system 104 may monitor the allocation (and/or release) of IP addresses that are allocated from the address group to first resources 105 in the network.

At 808, the service provider network may map the address group to a prefix list such that the prefix list includes the first IP addresses. For instance, the IPAM system 104 and/or prefix-management system 106 may store an association or mapping between a pool 110 (or address group) and the prefix list 132. In some examples, the prefix list 132 is used for access control (e.g., allow rules, deny rules, access control lists (ACLs), etc.) by a firewall device 108 in the network.

At 810, the service provider network may propagate the prefix list to the firewall device. For instance, the propagation component 130 may send or transmit the prefix list 132 to the firewall device 108.

At 812, the service provider network may receive, at the IP address manager, an allocation request to allocate second IP addresses to second resources in the network. For instance, the allocation component 122 may receive a request to allocate second IP addresses 112 to second resources 105 in the network.

At 814, the service provider network may determine that the allocation request is permitted by the allocation policy. For instance, the allocation request may fall within a permissible limit of the allocation policy 212, be requested by a permissible entity and/or for a permissible purpose as defined by the allocation policy 212, and so forth.

At 816, the service provider network may allocate the second IP addresses, from the set of IP addresses, to the second resources. For instance, the IPAM system 104 may indicate that the second resources 105 are permitted to use the second IP addresses 112, and store an indication that the second IP addresses 112 are no longer available for use or allocation.

At 818, the service provider network may cause, by the IP address manager, updating of the prefix list to indicate that the second IP addresses were allocated to generate an updated prefix list. For instance, the IPAM system 104 may notify the prefix-management system 106 regarding the allocation of the second IP addresses 112 such that the mappings component 128 may update the mapped prefix list 132 to result in an updated prefix list 132.

At 820, the service provider network may propagate the updated prefix list to the firewall device. For instance, the prefix-management system 106 may store indications of what network devices 108 utilize different prefix lists 132, and propagate updated prefix lists 132 to the appropriate devices 108 after the prefix lists 132 have been updated.

Figure 9:
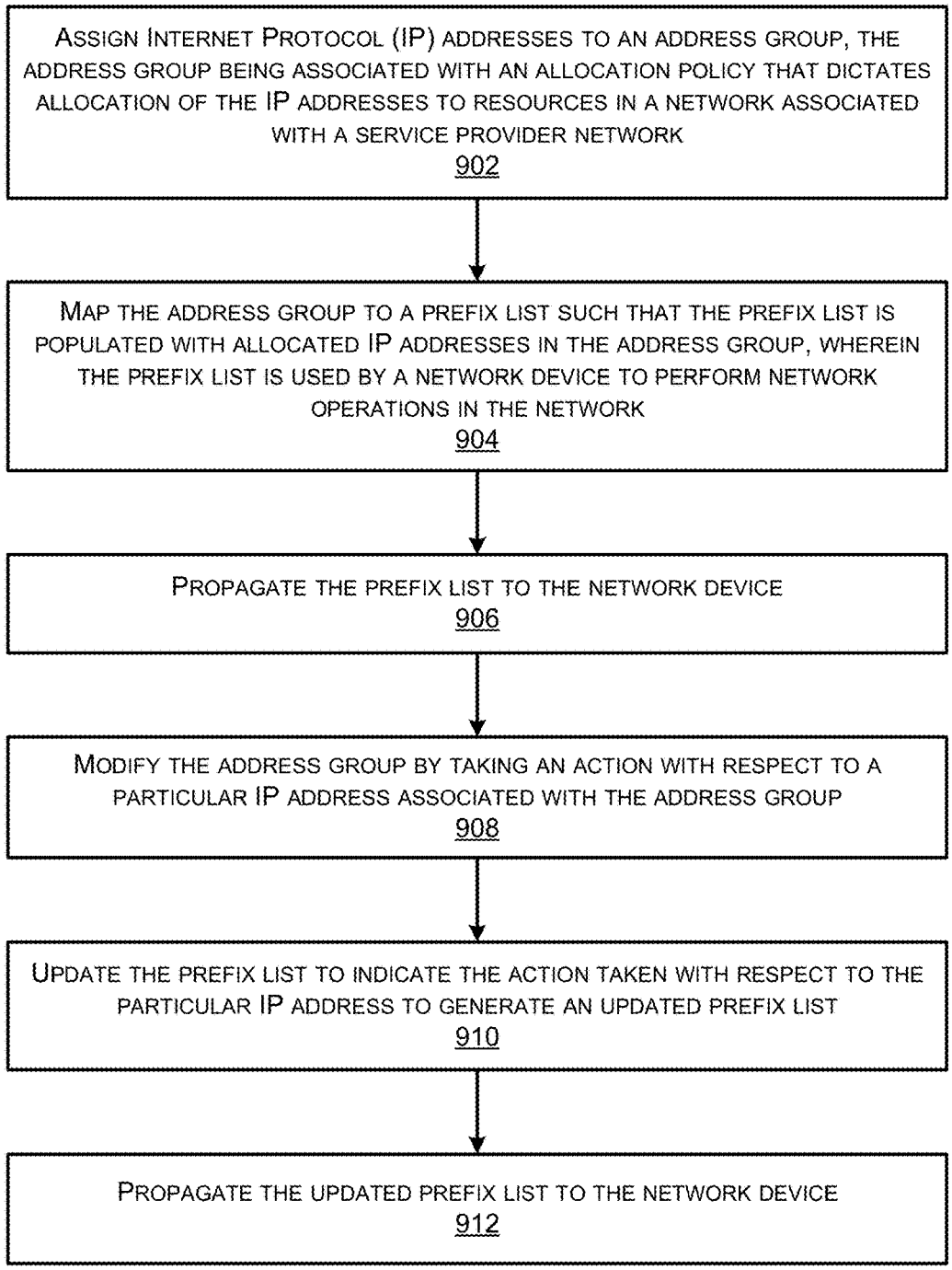
FIG. 9 illustrates a flow diagram of an example method for a system to map an address group to a prefix list, modify the prefix list to reflect a modification made to the address group, and propagate an updated prefix list to a network device.

FIG. 9 illustrates a flow diagram of an example method 900 for an IPAM system 104 to map an address group to a prefix list, modify the prefix list to reflect a modification made to the address group, and propagate an updated prefix list to a network device.

At 902, the service provider network may assign Internet Protocol (IP) addresses to an address group where the address group is associated with an allocation policy that dictates allocation of the IP addresses to resources in a network associated with a service provider network. For instance, IP addresses 112 (e.g., one or more CIDR blocks) may be assigned to an address group (e.g., pool 110) that is associated with an allocation policy 212 that defines allocation rules for allocating the IP addresses 112 to resources 105 in the network.

At 904, the service provider network may map the address group to a prefix list such that the prefix list is populated with allocated IP addresses in the address group. In some instances, the prefix list is used by a network device to perform network operations in the network.

At 906, the service provider network may propagate the prefix list to the network device. For instance, the propagation component 130 may send or transmit the prefix list 132 to the network device 108.

At 908, the service provider network may modify the address group by taking an action with respect to a particular IP address associated with the address group. For instance, the IPAM system 104 may add an IP address 112 to the pool 110, allocate an IP address 110 from the pool, and so forth.

At 910, the service provider network may update the prefix list to indicate the action taken with respect to the particular IP address to generate an updated prefix list. For instance, the change made to the pool 110 (or address group) may be carried through to the prefix list 132.

At 912, the service provider network may propagate the updated prefix list to the network device. For instance, the prefix-management system 106 may store indications of what network devices 108 utilize different prefix lists 132, and propagate updated prefix lists 132 to the appropriate devices 108 after the prefix lists 132 have been updated.

Figure 10:
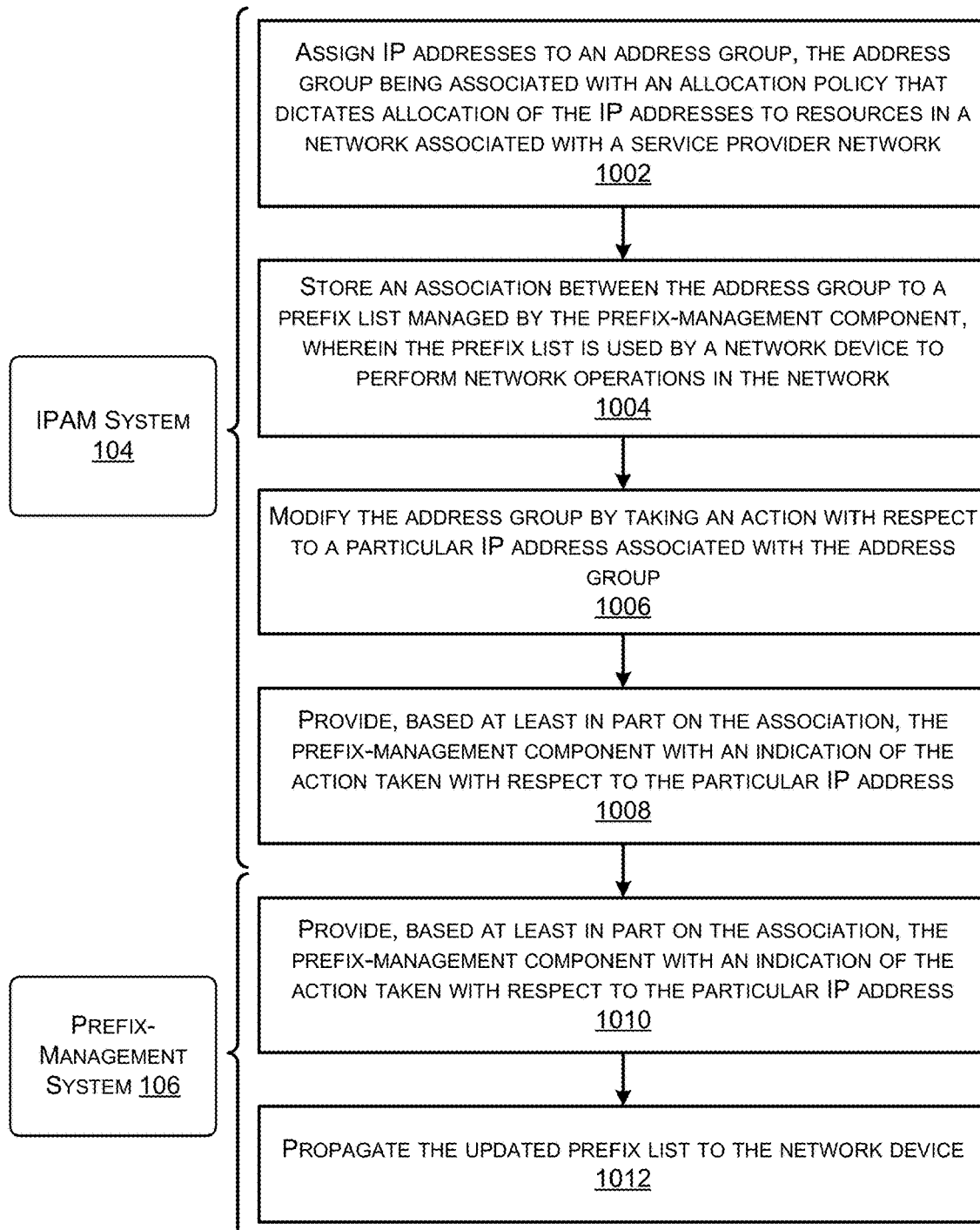
FIG. 10 illustrates a flow diagram of an example method for an IPAM system and a prefix-management system to map an address group to a prefix list, modify the prefix list to reflect a modification made to the address group, and propagate an updated prefix list to a network device.

FIG. 10 illustrates a flow diagram of an example method for an IPAM system 104 and a prefix-management system 106 to map an address group to a prefix list 132, modify the prefix list 132 to reflect a modification made to the address group, and propagate an updated prefix list 132 to a network device 108.

At 1002, an IPAM component/system 104 may assign IP addresses to an address group where the address group is associated with an allocation policy that dictates allocation of the IP addresses to resources in a network associated with a service provider network. For instance, IP addresses 112 (e.g., one or more CIDR blocks) may be assigned to an address group (e.g., pool 110) that is associated with an allocation policy 212 that defines allocation rules for allocating the IP addresses 112 to resources 105 in the network.

At 1004, the IPAM component/system 104 may store an association between the address group to a prefix list managed by the prefix-management component 106. In some instances, the prefix list 132 is used by a network device 108 to perform network operations in the network.

At 1006, the IPAM component/system 104 may modify the address group by taking an action with respect to a particular IP address associated with the address group. At 1008, the IPAM component/system 104 may provide, based at least in part on the association, the prefix-management component with an indication of the action taken with respect to the particular IP address.

At 1010, the prefix-management component 106 may update the prefix list to indicate the action taken with respect to the particular IP address to generate an updated prefix list. At 1012, the prefix-management component 106 may propagate the updated prefix list to the network device.

Figure 11:
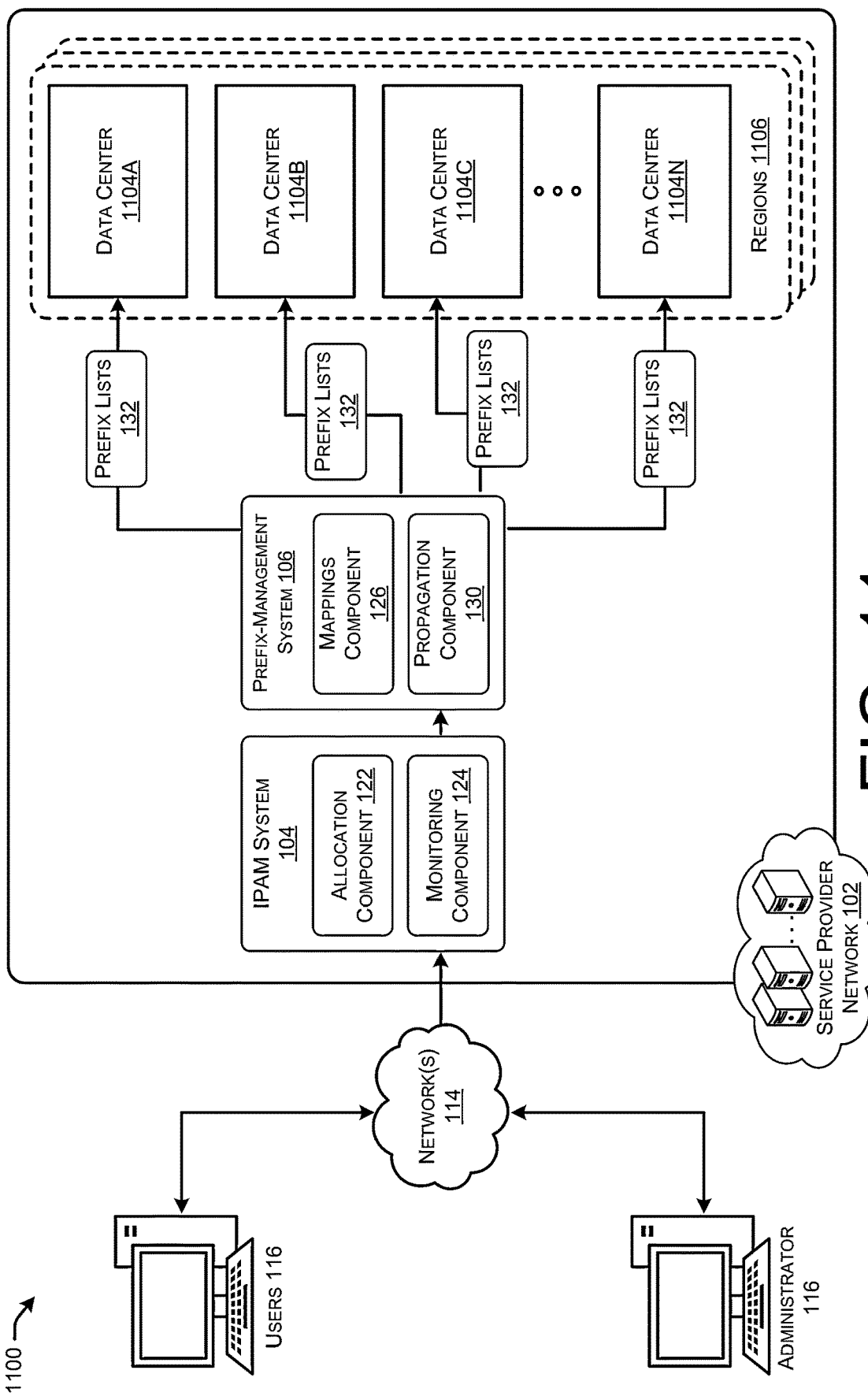
FIG. 11 is a system and network diagram that shows an illustrative operating environment that includes data centers of a service provider network that can be configured to implement aspects of the functionality described herein.

FIG. 11 is a system and network diagram 1100 that shows an illustrative operating environment that includes data centers 1104 in one or more regions 1106 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1104A-1104N (which might be referred to herein singularly as "a data center 1104" or in the plural as "the data centers 1104"). The data centers 1104 are facilities utilized to house and operate computer systems and associated components. The data centers 1104 typically include redundant and backup power, communications, cooling, and security systems. The data centers 1104 can also be located in geographically disparate locations, or regions 1108. One illustrative embodiment for a data center 1104 that can be utilized to implement the technologies disclosed herein will be described below with regard to FIG. 12.

The users 116 of the user devices that utilize the service provider network 102 may access the computing resources provided by the service provider network 102 over any wired and/or wireless network(s) 114, which can be a wide area communication network ("WAN"), such as the Internet, an intranet or an Internet service provider ("ISP") network or a combination of such networks. For example, and without limitation, a user device operated by a user 116 of the service provider network 102 may be utilized to access the service provider network 102 by way of the network(s) 114. It should be appreciated that a local-area network ("LAN"), the Internet, or any other networking topology known in the art that connects the data centers 1104 to remote clients and other users can be utilized. It should also be appreciated that combinations of such networks can also be utilized.

Figure 12:
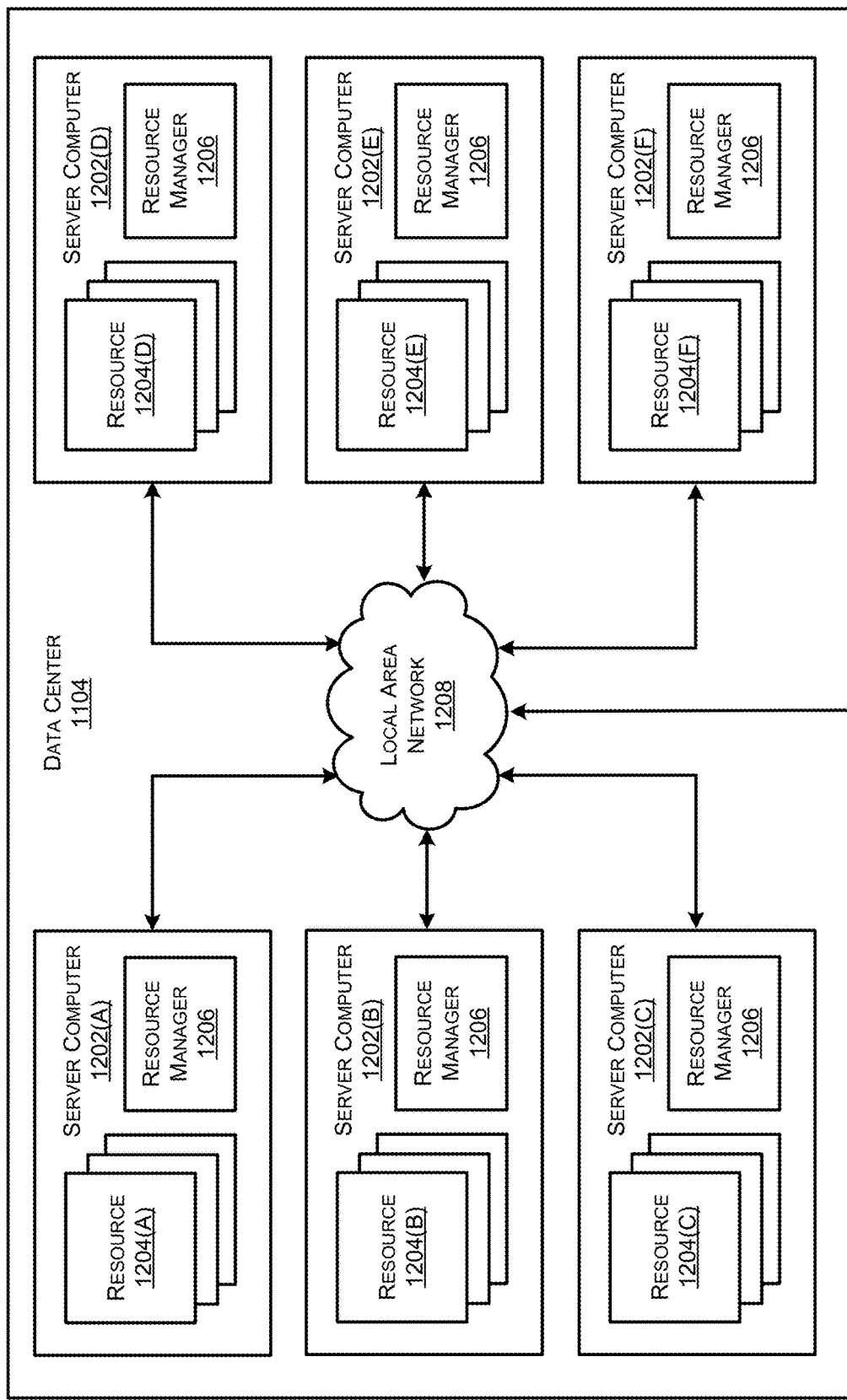
FIG. 12 is a computing system diagram illustrating a configuration for a data center that can be utilized to implement aspects of the technologies disclosed herein.

FIG. 12 is a computing system diagram 1200 that illustrates one configuration for a data center 1104 that implements aspects of the technologies disclosed herein. The example data center 1104 shown in FIG. 12 includes several server computers 1202A-1202F (which might be referred to herein singularly as "a server computer 1202" or in the plural as "the server computers 1202") for providing computing resources 1204A-1204E. In some examples, the resources 1204 and/or server computers 1202 may include, be included in, or correspond to, the computing devices described herein.

The server computers 1202 can be standard tower, rackmount, or blade server computers configured appropriately for providing the computing resources described herein (illustrated in FIG. 12 as the computing resources 1204A-1204E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1202 can also be configured to execute a resource manager 1206 capable of instantiating and/or managing the computing resources. In the case of VM instances, for example, the resource manager 1206 can be a hypervisor or another type of program configured to enable the execution of multiple VM instances on a single server computer 1202. Server computers 1202 in the data center 1104 can also be configured to provide network services and other types of services.

In the example data center 1104 shown in FIG. 12, an appropriate LAN 1208 is also utilized to interconnect the server computers 1202A-1202F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1204A-1204N, between each of the server computers 1202A-1202F in each data center 1104, and, potentially, between computing resources in each of the server computers 1202. It should be appreciated that the configuration of the data center 1104 described with reference to FIG. 12 is merely illustrative and that other implementations can be utilized.

Figure 13:
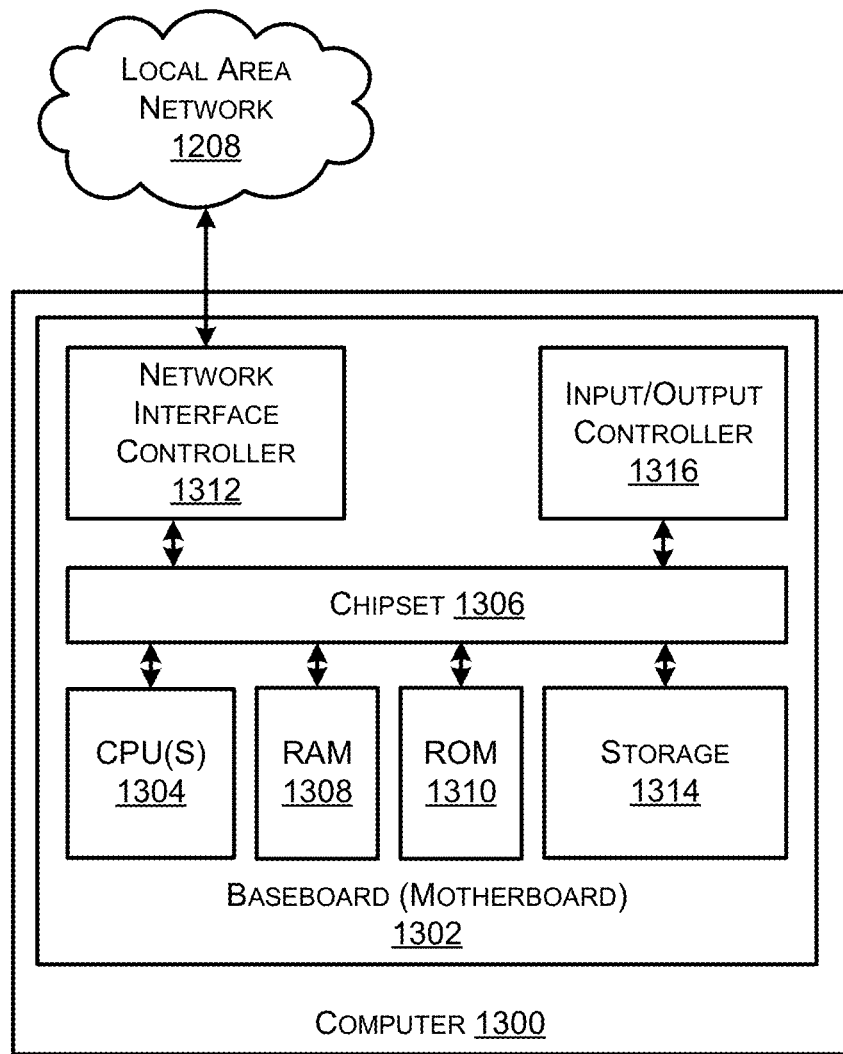
FIG. 13 is a computer architecture diagram showing an illustrative computer hardware architecture for implementing a computing device that can be utilized to implement aspects of the various technologies presented herein.

FIG. 13 shows an example computer architecture for a computer 1300 capable of executing program components for implementing the functionality described above. The computer architecture shown in FIG. 13 illustrates a conventional server computer, workstation, desktop computer, laptop, tablet, network appliance, e-reader, smartphone, or other computing device, and can be utilized to execute any of the software components presented herein.

The computer 1300 includes a baseboard 1302, or "motherboard," which is a printed circuit board to which a multitude of components or devices can be connected by way of a system bus or other electrical communication paths. In one illustrative configuration, one or more central processing units ("CPUs") 1304 operate in conjunction with a chipset 1306. The CPUs 1304 can be standard programmable processors that perform arithmetic and logical operations necessary for the operation of the computer 1300.

The CPUs 1304 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1306 provides an interface between the CPUs 1304 and the remainder of the components and devices on the baseboard 1302. The chipset 1306 can provide an interface to a RAM 1308, used as the main memory in the computer 1300. The chipset 1306 can further provide an interface to a computer-readable storage medium such as a read-only memory ("ROM") 1310 or non-volatile RAM ("NVRAM") for storing basic routines that help to startup the computer 1300 and to transfer information between the various components and devices. The ROM 1310 or NVRAM can also store other software components necessary for the operation of the computer 1300 in accordance with the configurations described herein.

The computer 1300 can operate in a networked environment using logical connections to remote computing devices and computer systems through a network, such as the network 1208. The chipset 1306 can include functionality for providing network connectivity through a network interface controller (NIC) 1312, such as a gigabit Ethernet adapter. The NIC 1312 is capable of connecting the computer 1300 to other computing devices over the network 1208 (or 114). It should be appreciated that multiple NICs 1312 can be present in the computer 1300, connecting the computer to other types of networks and remote computer systems.

The computer 1300 can include storage 1314 (e.g., disk) that provides non-volatile storage for the computer. The storage 1314 can consist of one or more physical storage units. The storage 1314 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1300 can further read information from the storage 1314 by detecting the physical states or characteristics of one or more particular locations within the physical storage units.

In addition to the storage 1314 described above, the computer 1300 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1300. In some examples, the operations performed by the service provider network 102, and or any components included therein, may be supported by one or more devices similar to computer 1300. Stated otherwise, some or all of the operations performed by the service provider network 102, and or any components included therein, may be performed by one or more computer devices 1300 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1314 can store an operating system utilized to control the operation of the computer 1300. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1314 can store other system or application programs and data utilized by the computer 1300.

In one embodiment, the storage 1314, RAM 1308, ROM 1310, and/or other computer-readable storage media may be encoded with computer-executable instructions which, when loaded into the computer 1300, transform the computer from a general-purpose computing system into a special-purpose computer capable of implementing the embodiments described herein. These computer-executable instructions transform the computer 1300 by specifying how the CPUs 1304 transition between states, as described above. According to one embodiment, the computer 1300 has access to computer-readable storage media storing computer-executable instructions which, when executed by the computer 1300, perform the various techniques described above. The computer 1300 can also include computer-readable storage media having instructions stored thereupon for performing any of the other computer-implemented operations described herein.

The computer 1300 can also include one or more input/output controllers 1316 for receiving and processing input from a number of input devices, such as a keyboard, a mouse, a touchpad, a touch screen, an electronic stylus, or other type of input device. Similarly, an input/output controller 1316 can provide output to a display, such as a computer monitor, a flat-panel display, a digital projector, a printer, or other type of output device. It will be appreciated that the computer 1300 might not include all of the components shown in FIG. 13, can include other components that are not explicitly shown in FIG. 13, or might utilize an architecture completely different than that shown in FIG. 13.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for an Internet Protocol (IP) address manager to manage usage of a plurality of IP addresses in a network of a service provider network, the method comprising:
   receiving, from an administrator account registered with the service provider network, a request for the IP address manager to manage usage of the plurality of IP addresses in the network;
   assigning a set of IP addresses from the plurality of IP addresses to an address group, the address group being associated with an allocation policy that defines allocation rules for allocating the set of IP addresses to resources in the network;
   determining first IP addresses, of the set of IP addresses, that are allocated to first resources in the network;
   mapping the address group to a prefix list such that the prefix list includes the first IP addresses, wherein the prefix list is used for access control by a firewall device in the network;
   propagating the prefix list to the firewall device;
   receiving, at the IP address manager, an allocation request to allocate second IP addresses to second resources in the network;
   determining that the allocation request is permitted by the allocation policy;
   allocating the second IP addresses, from the set of IP addresses, to the second resources;
   causing, by the IP address manager, updating of the prefix list to indicate that the second IP addresses were allocated to generate an updated prefix list; and
   propagating the updated prefix list to the firewall device.

2. The method of claim 1, wherein the prefix list is used in a route table by a routing device associated with the network, further comprising:
   propagating the updated prefix list to the routing device.

3. The method of claim 1, wherein the prefix list is a first prefix list used for a first firewall device in a first geographic region, further comprising:
   mapping the address group to a second prefix list used by a second firewall device for a second geographic region; and
   propagating the updated prefix list to the second firewall device.

4. A method comprising:
   assigning Internet Protocol (IP) addresses to an address group, the address group being associated with an allocation policy that dictates allocation of the IP addresses to resources in a network associated with a service provider network;
   mapping the address group to a prefix list such that the prefix list is populated with allocated IP addresses in the address group, wherein the prefix list is used by a network device to perform network operations in the network;
   propagating the prefix list to the network device;
   modifying the address group by taking an action with respect to a particular IP address associated with the address group;
   updating the prefix list to indicate the action taken with respect to the particular IP address to generate an updated prefix list; and
   propagating the updated prefix list to the network device.

5. The method of claim 4, wherein:
the network device is a firewall device that uses the prefix list for access control with the resources in the network; and
propagating the updated prefix list includes causing the updated prefix list to be sent to the firewall device to allow or deny traffic for particular resources associated with the updated prefix list.

6. The method of claim 4, wherein:
the network device is a routing device that uses the prefix list for a route table for routing traffic associated with the resources in the network; and
propagating the updated prefix list includes causing the updated prefix list to be sent to the routing device to route traffic for particular resources associated with the updated prefix list.

7. The method of claim 4, wherein the prefix list is a first prefix list used for a first firewall device in a first geographic region, further comprising:
mapping the address group to a second prefix list used by a second firewall device for a second geographic region; and
propagating the updated prefix list to the second firewall device.

8. The method of claim 4, wherein:
modifying the address group includes adding the particular IP address to the address group; and
updating the prefix list includes adding the particular IP address to the prefix list to generate the updated prefix list.

9. The method of claim 4, wherein:
modifying the address group includes removing the particular IP address from the address group; and
updating the prefix list includes removing the particular IP address from the prefix list to generate the updated prefix list.

10. The method of claim 4, wherein:
modifying the address group includes moving the particular IP address from the address group to a second address group; and
updating the prefix list includes removing the particular IP address to the prefix list,
further comprising:
adding the particular IP address to a second prefix list associated with the second address group to result in a second updated prefix list; and
propagating the second updated prefix list to the network device.

11. The method of claim 4, wherein the prefix list is a first prefix list associated with firewall devices in the network, further comprising:
mapping the address group to a second prefix list, wherein the second prefix list is used by routing devices to route traffic in the network;
updating the second prefix list to indicate the action taken with respect to the particular IP address associated with the address group to generate a second updated prefix list; and
propagating the second updated prefix list to the network device.

12. A system comprising:
one or more processors; and
one or more computer-readable media storing computer-executable instructions that, when executed by the one or more processors, cause an Internet Protocol address manager (IPAM) component to perform first operations and a prefix-management component to perform second operations;
the IPAM component configured to perform the first operations including:
assigning IP addresses to an address group, the address group being associated with an allocation policy that dictates allocation of the IP addresses to resources in a network associated with a service provider network;
storing an association between the address group to a prefix list managed by the prefix-management component, wherein the prefix list is used by a network device to perform network operations in the network;
modifying the address group by taking an action with respect to a particular IP address associated with the address group;
providing, based at least in part on the association, the prefix-management component with an indication of the action taken with respect to the particular IP address;
the prefix-management component configured to perform the second operations including:
updating the prefix list to indicate the action taken with respect to the particular IP address to generate an updated prefix list; and
propagating the updated prefix list to the network device.

13. The system of claim 12, wherein:
the network device is a firewall device that uses the prefix list for access control with the resources in the network; and
propagating the updated prefix list includes sending the updated prefix list to the firewall device to allow or deny traffic for particular resources associated with the updated prefix list.

14. The system of claim 12, wherein:
the network device is a routing device that uses the prefix list for a route table for routing traffic associated with the resources in the network; and
propagating the updated prefix list includes sending the updated prefix list to the routing device to route traffic for particular resources associated with the updated prefix list.

15. The system of claim 12, wherein:
the prefix list is a first prefix list used for a first firewall device in a first geographic region;
the first operations further include storing a second association between the address group and a second prefix list used by a second firewall device for a second geographic region; and
the second operations further include propagating the updated prefix list to the second firewall device.

16. The system of claim 12, wherein:
modifying the address group includes adding the particular IP address to the address group; and
updating the prefix list includes adding the particular IP address to the prefix list to generate the updated prefix list.

17. The system of claim 12, wherein:
modifying the address group includes removing the particular IP address from the address group; and
updating the prefix list includes removing the particular IP address from the prefix list to generate the updated prefix list.

18. The system of claim 12, wherein:
modifying the address group includes moving the particular IP address from the address group to a second address group; and
updating the prefix list includes removing the particular IP address from the prefix list,
the second further include:
  adding the particular IP address to a second prefix list associated with the second address group to result in a second updated prefix list; and
  propagating the second updated prefix list to the network device.

19. The system of claim 12, wherein:
the prefix list is a first prefix list associated with firewall devices in the network;
the first operations further comprising storing another association between the address group and a second prefix list managed by the prefix-management component, wherein the second prefix list is used by routing devices to route traffic in the network.

20. The system of claim 19, the second operations further comprising:
  updating, based at least in part on the other association, the second prefix list to indicate the action taken with respect to the particular IP address to generate a second updated prefix list; and
  propagating the second updated prefix list to the network device.

* * * * *